US011689589B1

(12) United States Patent
Thom et al.

(10) Patent No.: US 11,689,589 B1
(45) Date of Patent: Jun. 27, 2023

(54) USING A COMMUNICATIONS APPLICATION TO ANALYZE AND DISTRIBUTE DATA ANALYTICS

(71) Applicant: Tableau Software, LLC, Seattle, WA (US)

(72) Inventors: Dylan Thom, San Francisco, CA (US); Khushboo Bharat Shah, San Francisco, CA (US); James Russell Diefenderfer, San Francisco, CA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/583,164

(22) Filed: Jan. 24, 2022

Related U.S. Application Data

(60) Provisional application No. 63/246,301, filed on Sep. 20, 2021.

(51) Int. Cl.
*H04L 65/401* (2022.01)
*H04L 51/046* (2022.01)
(Continued)

(52) U.S. Cl.
CPC ........ *H04L 65/4015* (2013.01); *G06T 11/206* (2013.01); *H04L 51/046* (2013.01); *H04L 67/55* (2022.05)

(58) Field of Classification Search
None
See application file for complete search history.

(56) References Cited

U.S. PATENT DOCUMENTS 10,515,121 B1   12/2019   Setlur et al.
10,546,001 B1   1/2020    Nguyen et al.
(Continued)

FOREIGN PATENT DOCUMENTS

EP        3535676 A1      9/2019
WO    WO2020/076811 A1   4/2020

OTHER PUBLICATIONS

Atallah, Preinterview First Office Action, U.S. Appl. No. 16/940,267, dated Feb. 22, 2022, 6 pgs.
(Continued)

*Primary Examiner* — Chris Parry
*Assistant Examiner* — Abderrahmen Chouat
(74) *Attorney, Agent, or Firm* — Morgan, Lewis & Bockius LLP

(57) ABSTRACT

The various implementations described herein include methods and devices for using a messaging system to analyze and distribute data analytics. In one aspect, a method includes displaying a user interface for a communications application, the user interface including a dashboard display area for a group of users. In response to a user input, display of the dashboard display area is replaced with a view corresponding to a data analysis application. The data analysis application is separate from the communications application, and the view corresponding to the data analysis application provides access to reports generated, using credentials of a user of the communications application, without user input to execute or open the data analysis application. A second user input is received requesting to share a report with the selected group of users, and in response, the report is published to the dashboard display area for the selected group of users.

20 Claims, 30 Drawing Sheets

(51) Int. Cl.
  *G06T 11/20* (2006.01)
  *H04L 67/55* (2022.01)

(56) References Cited

U.S. PATENT DOCUMENTS

| | | |
|---|---|---|
| 2017/0011023 A1 | 1/2017 | Ghannam et al. |
| 2017/0076507 A1 | 3/2017 | Bivins |
| 2017/0154089 A1 | 6/2017 | Sherman |
| 2017/0249711 A1* | 8/2017 | Odegard ................ G06Q 50/16 |
| 2017/0277669 A1* | 9/2017 | Sekharan .............. G06F 40/169 |
| 2017/0277696 A1* | 9/2017 | Sekharan .............. H04L 65/403 |
| 2017/0308571 A1 | 10/2017 | McCurley et al. |
| 2018/0189294 A1 | 7/2018 | Anand et al. |
| 2019/0163807 A1 | 5/2019 | Jain et al. |
| 2019/0272296 A1 | 9/2019 | Prakash et al. |
| 2020/0241903 A1 | 7/2020 | Wang et al. |
| 2020/0293167 A1 | 9/2020 | Blyumen |
| 2021/0004370 A1* | 1/2021 | Sekharan ............ G06F 16/2455 |
| 2022/0172723 A1* | 6/2022 | Tendolkar ............... G10L 25/78 |

OTHER PUBLICATIONS

Atallah, First Action Interview Office Action, U.S. Appl. No. 16/940,267, dated Mar. 22, 2022, 5 pgs.

Atallah, Notice of Allowance, U.S. Appl. No. 16/940,267, dated Aug. 4, 2022, 7 pgs.

Hearst, Office Action, U.S. Appl. No. 17/206,046, dated Feb. 10, 2022, 17 pgs.

Hearst, Final Office Action, U.S. Appl. No. 17/206,046, dated Sep. 12, 2022, 18 pgs.

Tableau Software, LLC, International Search Report and Written Opinion, PCT/US2021/040919, dated Oct. 18, 2021, 11 pgs.

* cited by examiner

USING A COMMUNICATIONS APPLICATION TO ANALYZE AND DISTRIBUTE DATA ANALYTICS

TECHNICAL FIELD

The disclosed implementations relate generally to data analytics and more specifically to systems, methods, and user interfaces that enable users to analyze and distribute data analytics within a communications application.

BACKGROUND

Data analytics applications enable a user to understand a data set visually, including distribution, trends, outliers, and other factors that are important to making business decisions. Some data sets are very large or complex and include many data fields. Various tools can be used to help understand and analyze the data, including dashboards that have multiple data visualizations. However, some functionality may be difficult to use or hard to find within a complex user interface. Moreover, data visualizations and reports created by a user can be difficult to replicate and distribute to others.

SUMMARY

Companies are relying more on analytical insights to gain a competitive advantage and propel their business forward. Many companies have employees who have a responsibility to monitor company performance and find, view, and share analytical assets. As noted above, it can be challenging to create and share analytic assets.

However, companies are also beginning to rely more on communications applications for intra-company communication. Communication channels allow for one-to-many communication, keeping teams connected and promoting connected and collaborative culture. The present disclosure describes systems and methods for integrating data analytics into a communications application. In this way, users are able to quickly and efficiently generate and share analytic asset images, without having to switch between applications or follow complex exportation procedures.

For example, the systems of the present disclosure enable users to link their communications application with their data analytics application and then use the resulting inter-application communication to generate and share analytic asset images within the communications applications, without needing to switch to the data analytics application. In some circumstances, this improves user efficiency by reducing the amount human-machine interactions. In some circumstances, this also reduces a computational load on the user's computing device by not requiring processing resources or memory for separate execution of the full data analytics application. For example, the communications application automatically executes the data analytics application in a headless browser to generate the analytic asset image, which is captured for use in the communications application.

In addition to manually generating and sharing updated data visualizations from within the communications application, the user can subscribe to various reports and dashboards to get updated data visualizations on a regular basis, or have the updated visualizations published to a channel (e.g., a channel for the user's team) in the communications application. The users can also set up notifications so that they (or their team) are alerted if a performance indicator meets some preset criteria.

In accordance with some implementations, a method is performed at an electronic device. The method includes displaying a first user interface for a communications application, the first user interface including a dashboard display area for a selected group of users. In response to a first user input, the method replaces display of the dashboard display area with a view corresponding to a data analysis application. The data analysis application is a separate application from the communications application. The view corresponding to the data analysis application provides access to one or more reports generated, using credentials of a user of the communications application, without user input to execute or open the data analysis application. The method further includes receiving a second user input requesting to share a first report of the one or more reports with the selected group of users. The first report is generated in response to a user request received in the communications application. The method publishes the first report to the dashboard display area for the selected group of users.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus, methods, systems, and graphical user interfaces are disclosed that enable users to analyze and distribute data analytics within a communications application. Such methods may complement or replace conventional methods for analyzing and distributing data analytics.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 2A-2E illustrate example user interactions with the example graphical user interface of FIG. 1 in accordance with some implementations.

FIGS. 4A-4D illustrate example user interactions with the example graphical user interface of FIG. 1 in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

With more companies having employees working remotely from around the globe, communications applications have become a primary means of communication for many employees and teams. Therefore, it is increasingly important for users to be able to create and distribute data analytics to their coworkers and teams via the communications applications. For example, members of an engineering team want to have a key performance indicator (KPI) monitored so they can be alerted if it falls below a particular threshold. An example communications application of the present disclosure receives KPI information from a linked data analytics application and, when the KPI falls below the threshold, publishes a notification to an engineering team channel within the communications application. In this example, a member of the engineering team uses the communications application to generate a report with additional information about the KPI. The member then shares the generated report to the engineering team channel. The engineering team member may also identify tasks based on the generated report and assign the tasks to other team members via the engineering team channel. In this way, issues can be identified and addressed quickly and efficiently using the communications application.

Figure 1:
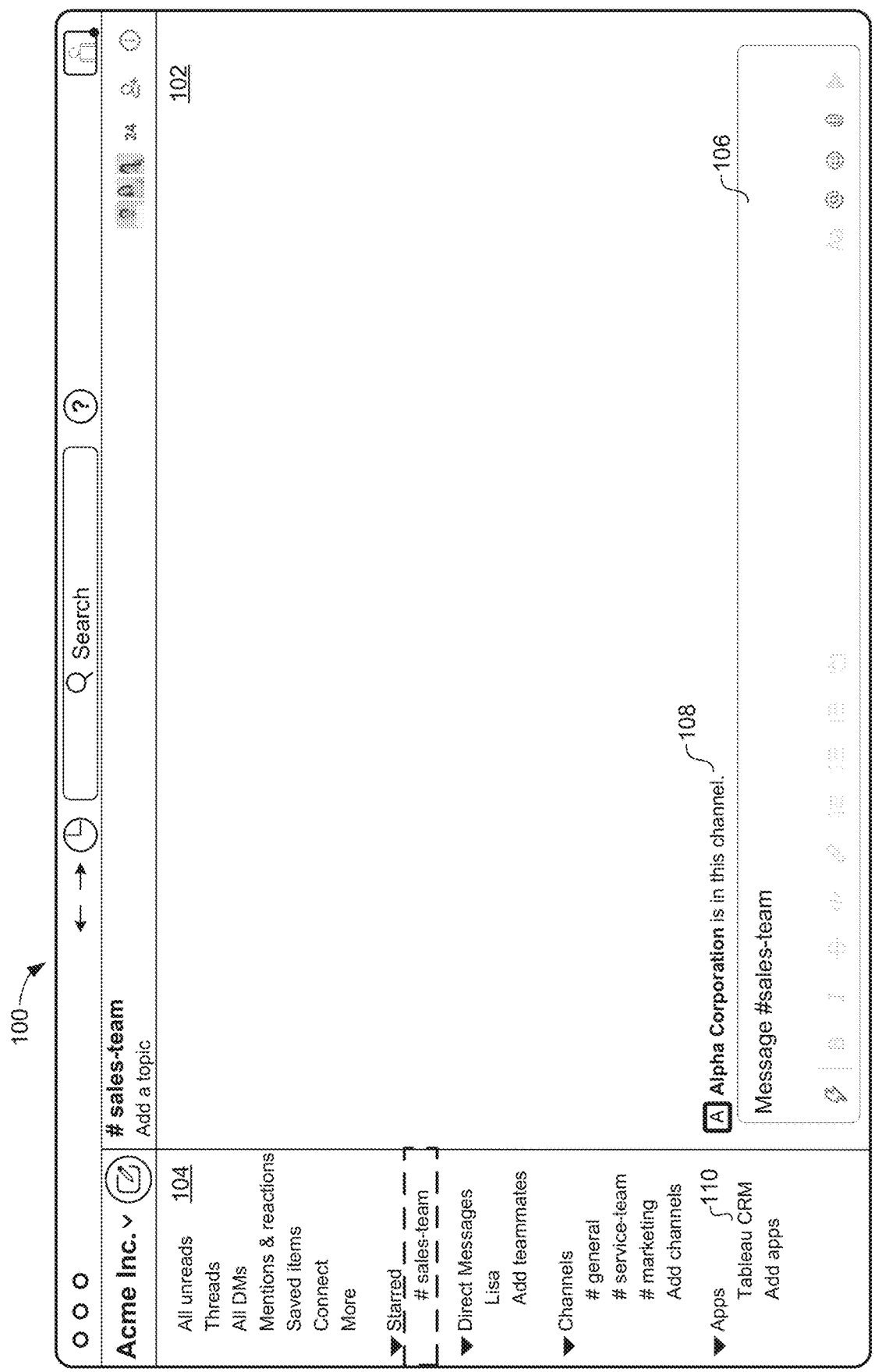
FIG. 1 illustrates an example graphical user interface of a communications application in accordance with some implementations.

Turning now to the figures, FIG. 1 illustrates a graphical user interface 100 of a communications application in accordance with some implementations. The graphical user interface 100 enables a user to communicate with other users (e.g., other members of #sales-team). FIG. 1 illustrates a communications channel 102 (e.g., a dashboard display area), a navigation tab 104 (also sometimes called a navigation panel), and a data entry box 106 for inserting a message to be sent to other users. The communications channel 102 in FIG. 1 is a "sales-team" channel (also sometimes called a page) for a company Acme Inc. The channel 102 displays a dashboard for the sales team (e.g., including analytic asset images and message threads that can be viewed by the members of sales-team). FIG. 1 also shows a notification 108 that a third-party, Alpha Corporation, is a member of Acme Inc.'s sales-team channel.

The navigation tab 104 allows for viewing other messages, other channels, and pages for other applications (e.g., the "Tableau CRM" linked application 110) within the communications application. In some implementations, the communications application is a messaging application, such as an instant messaging application, that communicates with an external application (e.g., the linked application 110). In some implementations, the external application is a data processing application, with access to data sources, and provides metrics and analytics for data from the data sources.

Figure 2A:
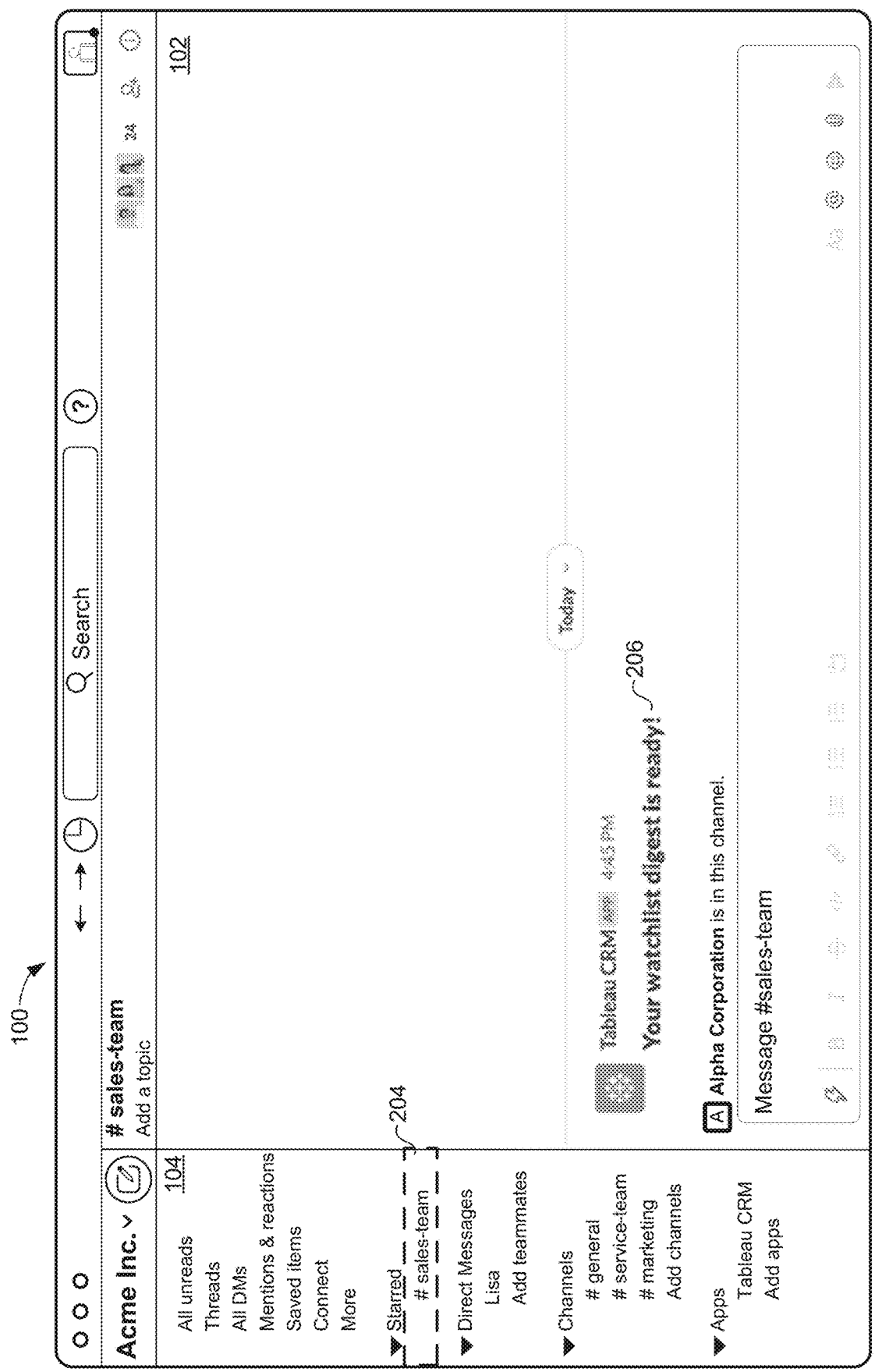
Figure 2B:
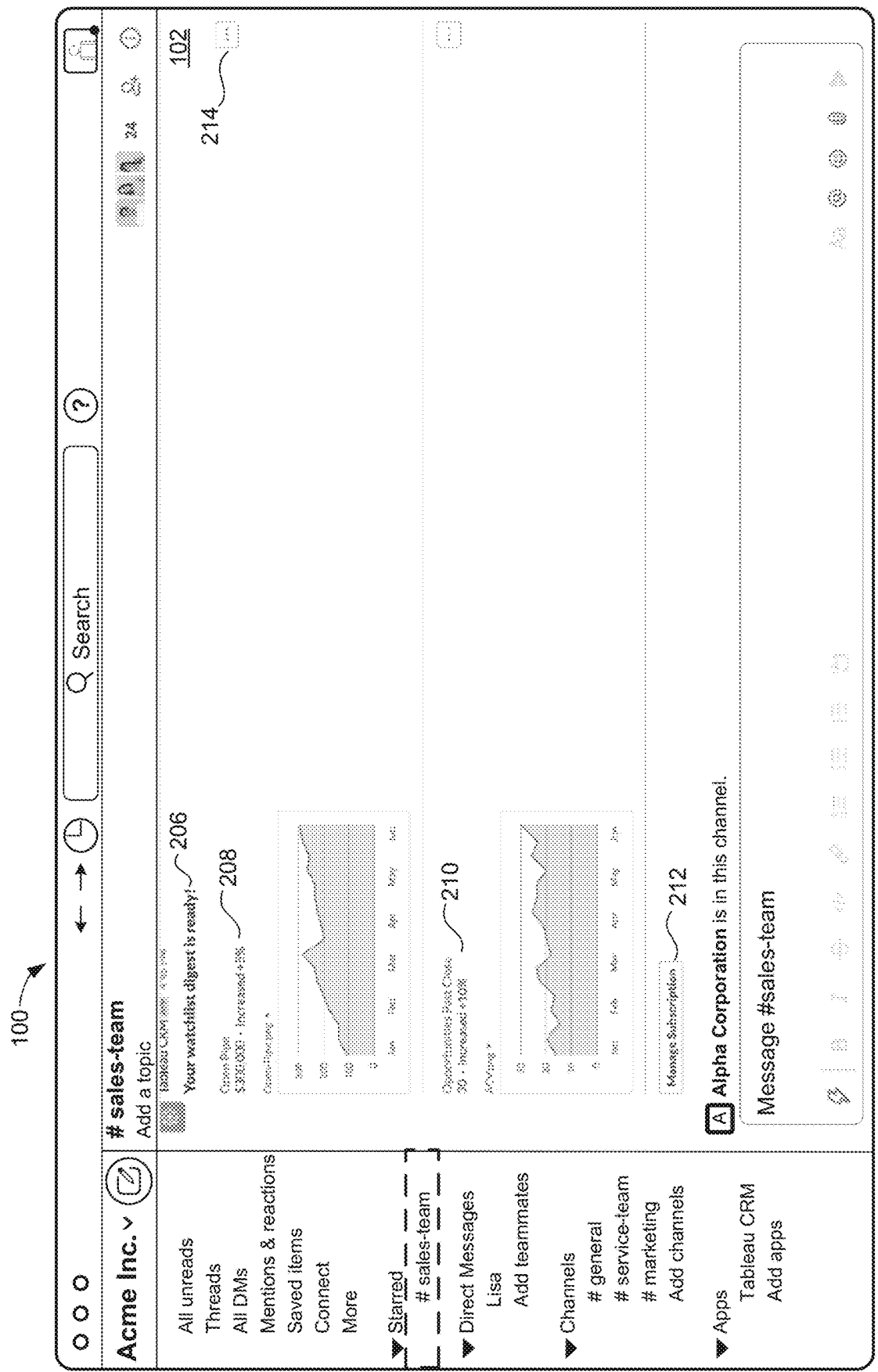

FIGS. 2A-2E illustrate example user interactions with the graphical user interface 100 in accordance with some implementations. FIGS. 2A-2B illustrate a watchlist digest of key metrics displayed on the channel 102 for the sales team. For example, FIG. 2A illustrates a notification 206 that "your watchlist digest is ready", and the user can interact with the user interface 100 to display the analytic assets 208 and 210 shown in FIG. 2B. In some implementations, the user interaction is scrolling down within the channel 102. In some implementations, the user interaction is providing a user input, such as selecting (e.g., clicking on) the notification 206.

FIG. 2A further shows that the sales-team channel 102 is active and selected in the navigation tab 104, e.g., via the highlighting 204. In some implementations, the user navigates to the application user interface illustrated in FIG. 2A by scrolling down within the user interface displayed in FIG. 1. In some implementations, the watchlist is pushed (e.g., automatically without user input) to a team channel on a periodic basis, or a predefined schedule, such as daily, weekly, hourly, etc. For example, the team channel 102 is provided to all of the users (e.g., members) that are part of the sales team. Accordingly, the team members receive updated information via the watchlist digest on a predefined schedule (e.g., on a daily basis). In some implementations, the content of a watchlist digest is based on a state of the data at the time the digest is generated. For example, the digest includes information on performance metrics that that are currently outside of expected ranges. In some implementations, the content of the watchlist digest is selected by the creator while setting up the digest. For example, the creator of the digest shown in FIG. 2B may have requested that the digest include information for the "Open Pipe" analytic asset 208 and the "Opportunities Past Close" analytic asset 210. In some implementations, the content of the digest is personalized to each user in the channel. For example, a first user receives information for "Open Pipe" analytic asset 208 only, and a second user receives information for "Opportunities Past Close" analytic asset 210 only.

FIG. 2B further shows a subscribe affordance 212 allowing users to manage their subscription to the watchlist digest and a menu affordance 214 allowing users to open a menu for interacting with the analytic asset, such as sharing, viewing additional details, saving, and printing. The example assets in FIG. 2B represent sales metrics for "Open Pipe" and for "Opportunities Past Close", which both include highlighted data that illustrates a change (or other trend measured over time) to the data. For example, the user interface 100 displays that Open Pipe has "Increased +5%." (e.g., the dollar amount of the pipeline has increased). In addition, the number of opportunities has increased. Thus, it is easy for the sales team to remain up-to-date on the current metrics (and trends) for key metrics.

Figure 2C:
Figure 2D:
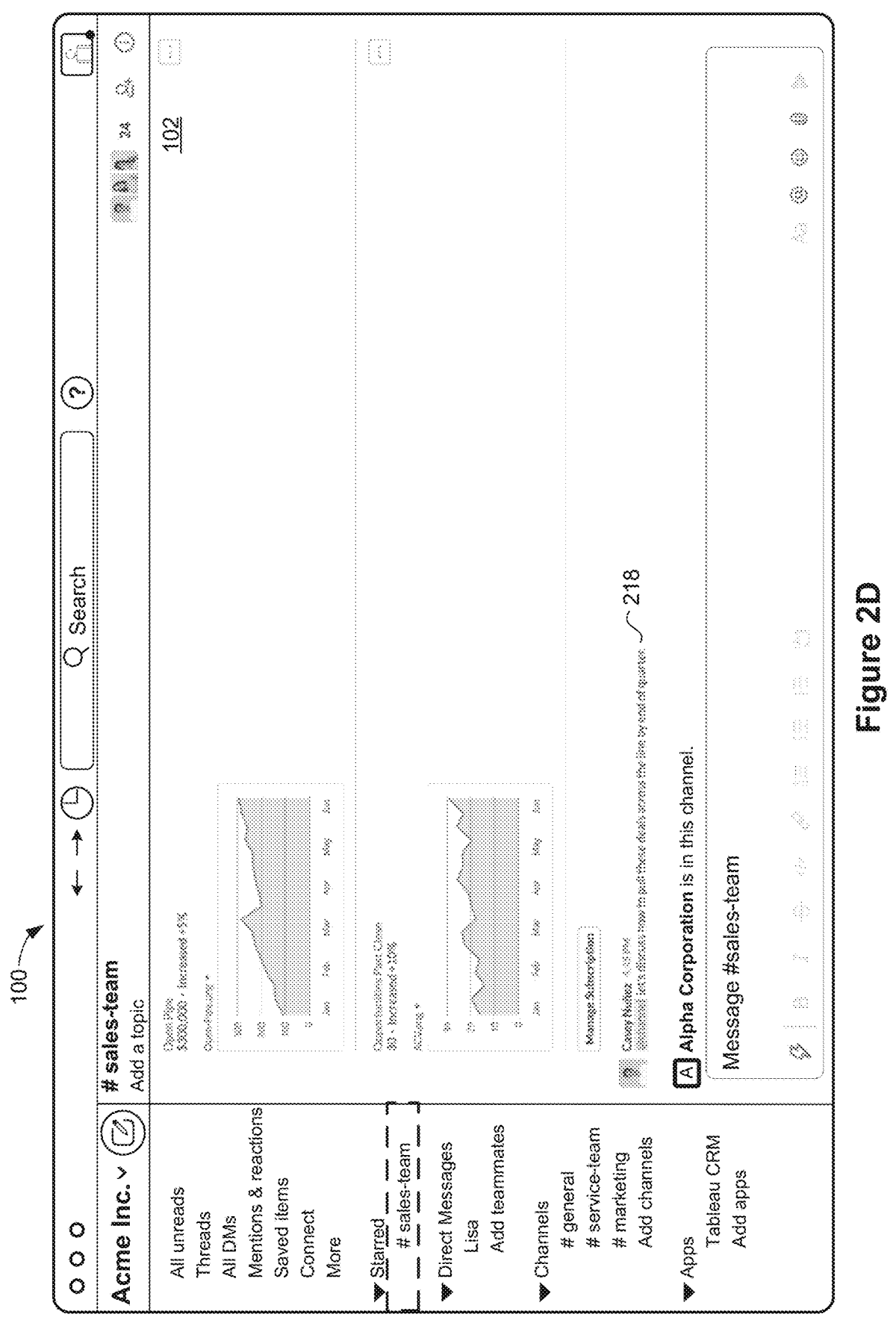
Figure 2E:
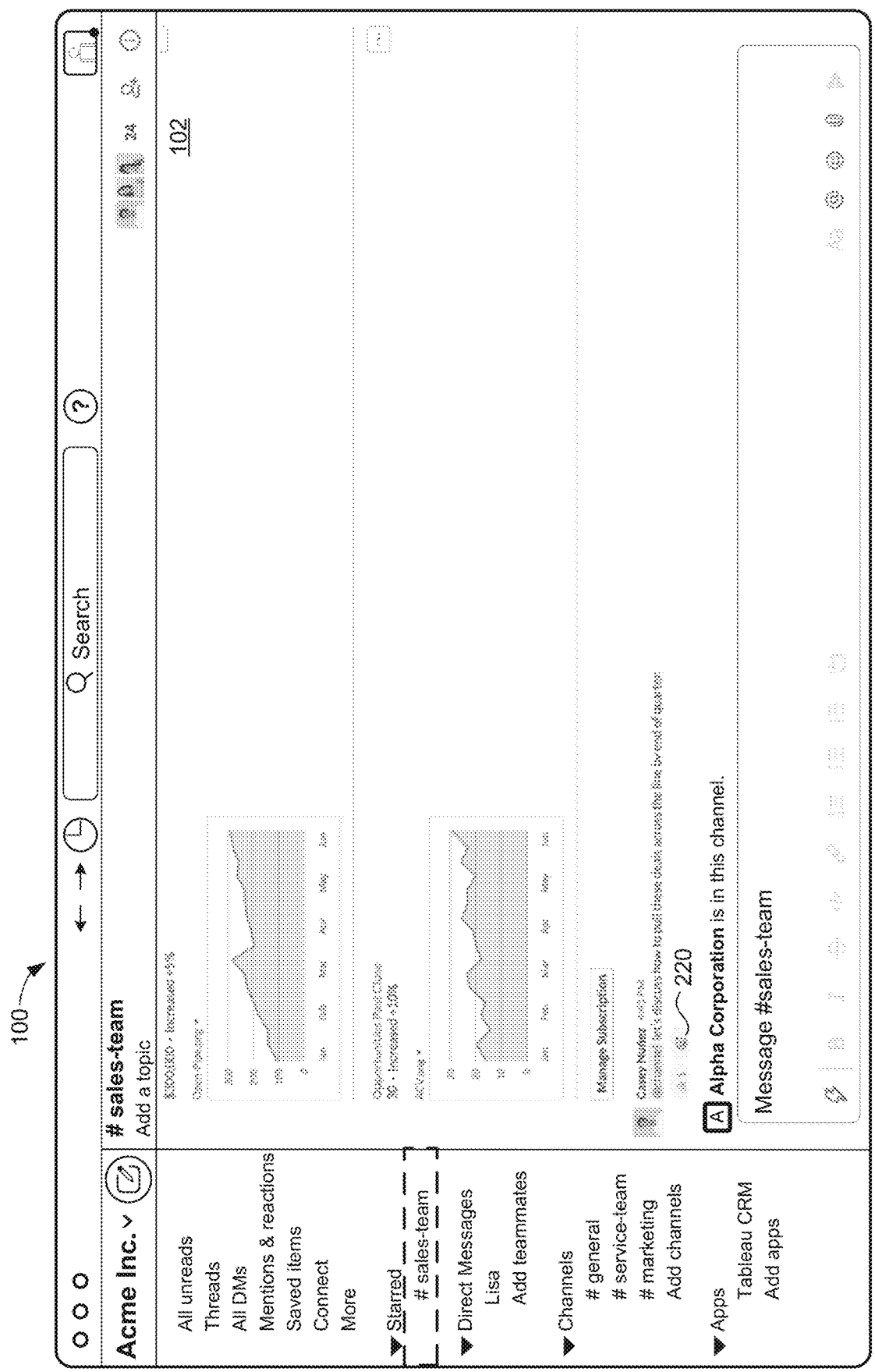

FIGS. 2C-2D illustrates a user drafting a message 216 and then posting the message to the channel (e.g., with the "@channel" notifier). In the displayed example, the message 218 relates to the watchlist and is published to the other members of the team in a portion of the user interface close to the watchlist. For example, FIG. 2D illustrates the posted message 218 is displayed under the watchlist graphs, e.g., with an indication of the user that posted the message, Casey Nunez. FIG. 2E illustrates reactions 220 to the posted message 218, including displaying a "thumbs up" to indicate that another member of the team has read and approves of the posted message 218.

Figure 3A:
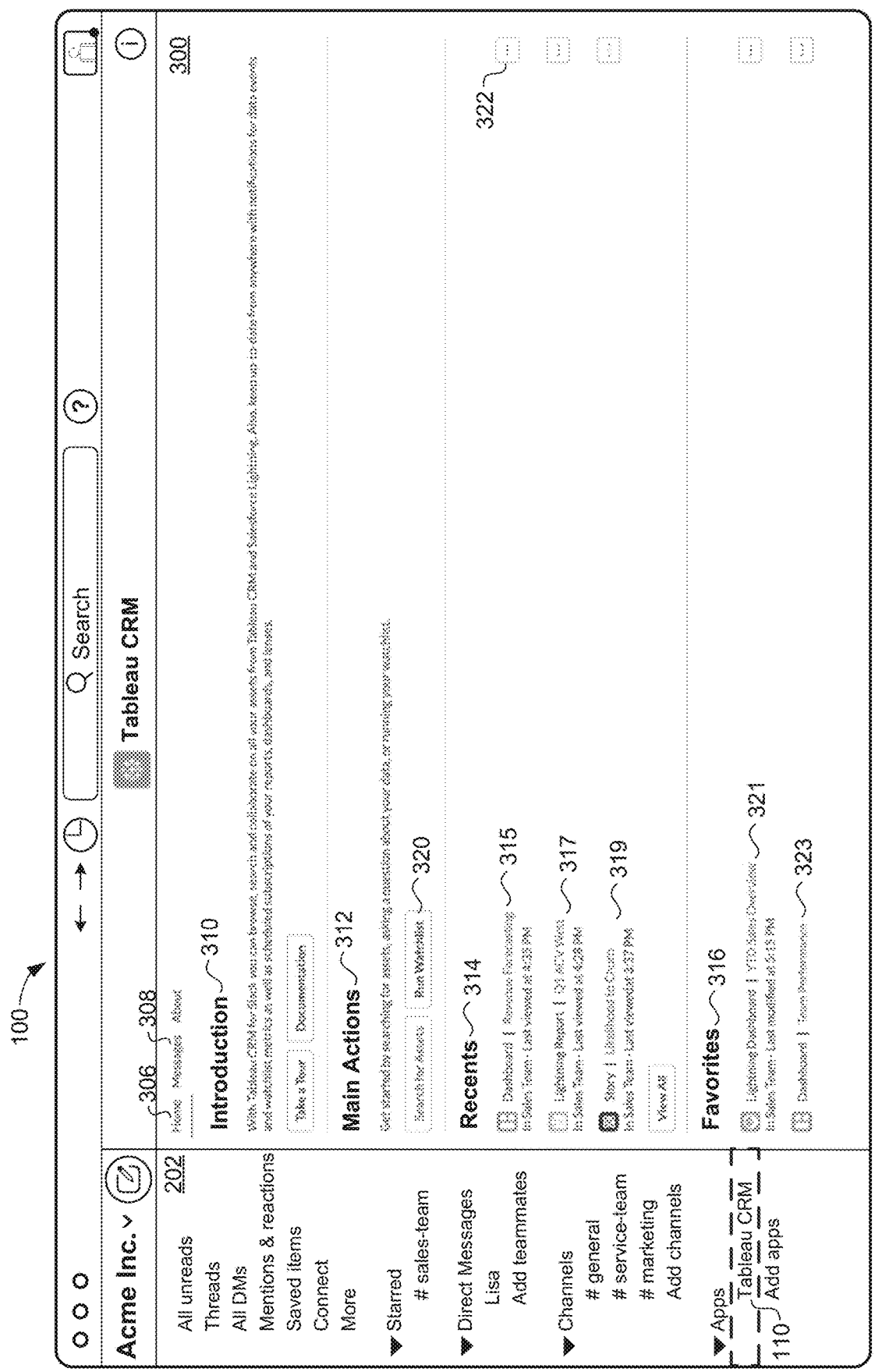
FIGS. 3A-3N illustrate example user interactions with another example graphical user interface in accordance with some implementations.

FIGS. 3A-3J illustrate example user interactions with the graphical user interface 100 in accordance with some implementations. FIG. 3A illustrates the user selecting the "Tableau CRM" linked application 110 from the navigation tab 202. In response to the user selecting the linked application 110, a view corresponding to the linked application 110 is displayed (e.g., in the user interface to the right of the navigation panel), as shown in FIG. 3A. As shown in FIG. 3A, the view corresponding to the application (also sometimes called the application view) replaces the channel 102 shown in FIG. 1. In some implementations, the application view 300 is a home page for the application. In some implementations, the application view 300 provides additional data analysis tools than the tools provided in the messaging application.

The application view 300 in FIG. 3A includes a home tab 306, a messages tab 308 and an about tab. In some implementations, the application view includes more or less tabs, e.g., only includes the home tab 306, or also includes a settings tab. The application view 300 also includes an introduction section 310, a main actions section 312, a recents section 314, and a favorites section 316. In some implementations, the application view includes more or less sections, e.g., doesn't include the introduction section 310, or also includes a subscriptions section. The introduction section 310 includes information about the linked application 110 along with a "Take a Tour" affordance and a "Documentation" affordance to assist users with familiarizing themselves with the linked application 110. The main actions section 312 includes a "Search for Assets" affordance to assist the user in finding particular assets and a "Run Watchlist" affordance 320 to generate an up-to-date watchlist digest in accordance with some implementations.

The recents section 314 includes a list of analytic assets with which the user has recently interacted. The list of analytic assets includes a dashboard asset 315, a report asset 317, and a story asset 319. Each asset also has a corresponding menu affordance 322. For example, the user is enabled to select "Revenue Forecasting" which is stored in the "Sales Team" folder. In some implementations, permissions for the folder, e.g., the "Sales Team" folder, are used to determine permissions for generating and sharing the analytic asset image. Instead of the user needing to separately open a separate data analysis application to interact with the analytic assets, the user is able to interact with the asset images within the communications application. For example, the user is not required to launch, login to, and interact within another application.

The favorites section 316 includes a list of analytic assets that the user has indicated are favorites. In some implementations, the user has indicated within the data analysis application that the assets are favorites, and the favorites are communicated to the communications application for display in the favorites section 316. In the example of FIG. 3A, the user's list of favorited assets includes a "YTD Sales Overview" dashboard asset 321 and a "Team Performance" dashboard asset 323. Each favorited asset also has a corresponding menu affordance. For example, the favorites section 316 is customizable by the user so that the user can easily access certain reports and previews for particular data. In some implementations, application view 300 only includes analytic assets (e.g., included in the recents section 314 or the favorites section 316) for which the user has share permissions.

Figure 3B:
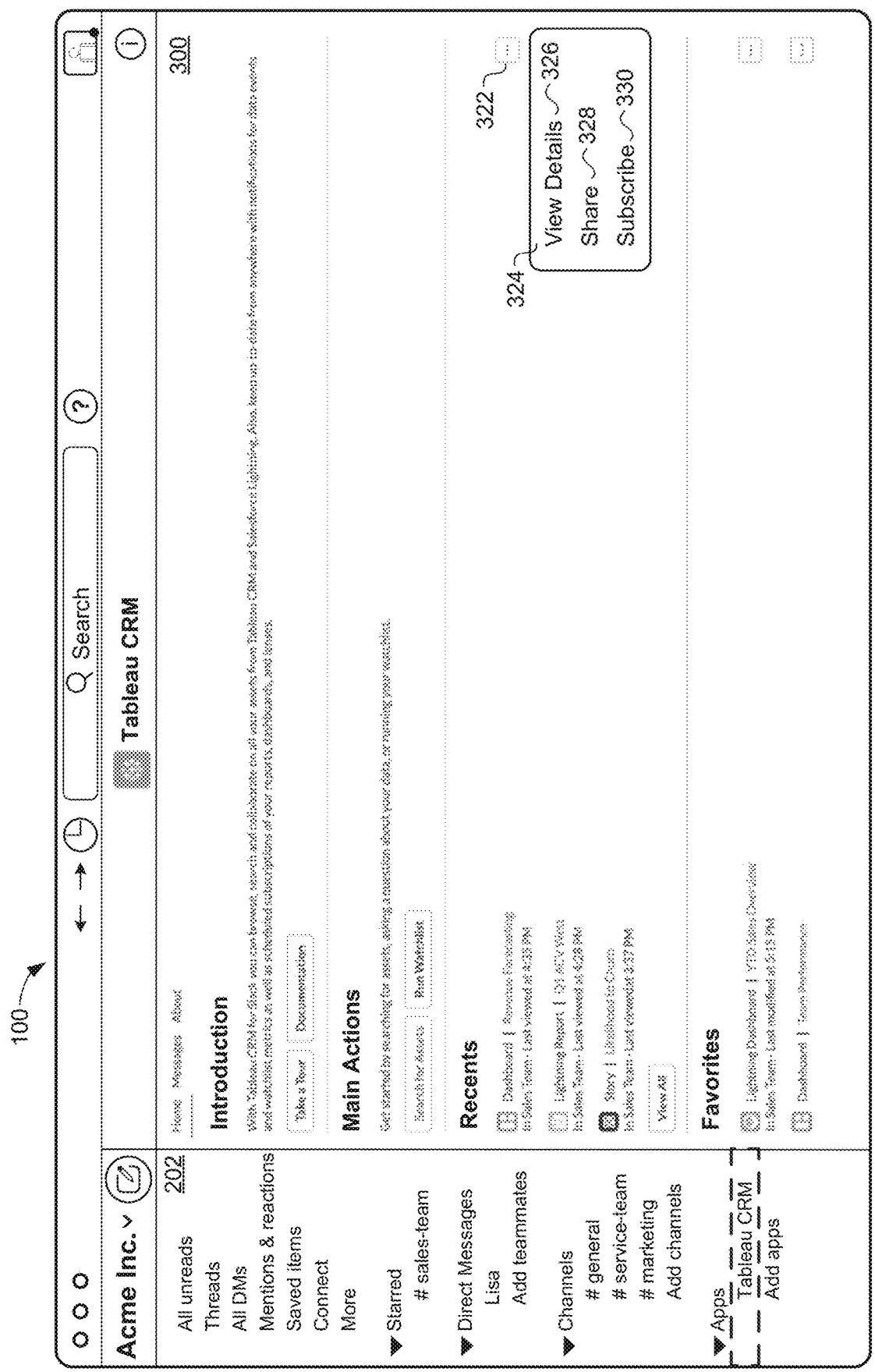

FIG. 3B shows an asset menu 324 displayed in response to a user selection of the menu affordance 322. In accordance with some implementations, for each asset, the user is able to view details, share, and/or subscribe (e.g., to notifications/updates of the asset), as illustrated by the menu 324 presented in FIG. 3B. Specifically, the menu 324 includes a view details affordance 326, a share affordance 328, and a subscribe affordance 330.

Figure 3C:
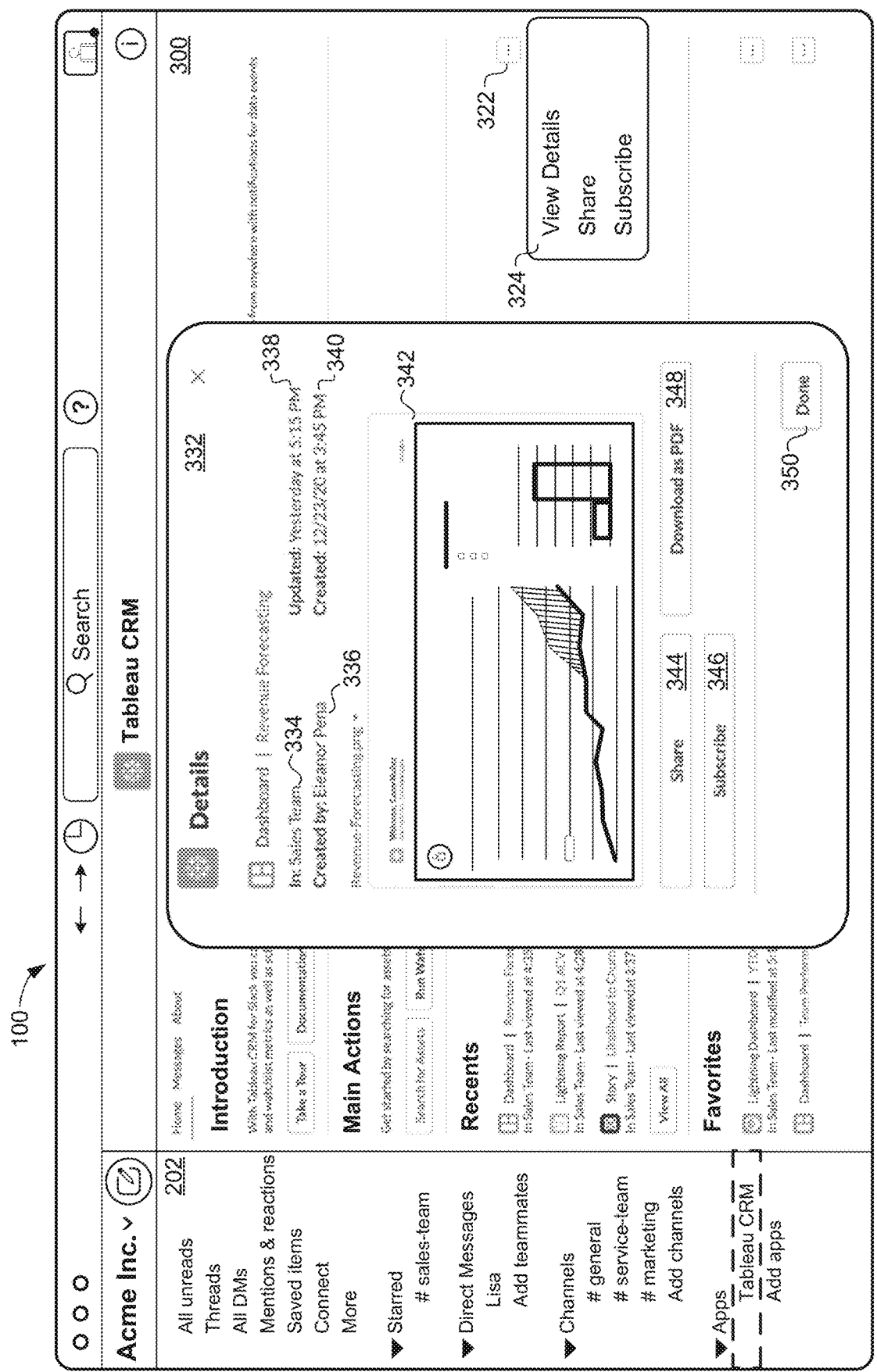

The details window 332 in FIG. 3C is displayed in response to the user selecting the view details affordance 326 in FIG. 3B. The details window 332 includes metadata for the asset, such as the team information 334, the creator information 336, the creation date information 340, and the update date information 338. The details window 332 also includes a data visualization 342, e.g., the Revenue-Forecasting.png, and a plurality of affordances. In accordance with some implementations, the plurality of affordances includes a share button 344, a subscribe button 346, and a download button 348. The details window 332 also includes a done affordance 350 for closing the details window.

In some implementations, the data visualization 342 is a real-time data capture (e.g., a screenshot) generated for the user (e.g., using the user's credentials) at the point in time when the user selected the view details affordance. For example, the dashboard asset 315 is run (automatically, without the user explicitly requesting to run the dashboard) in response to the user selecting the view details affordance 326. In some implementations, the data visualization 342 is updated on a periodic basis (e.g., every 30 minutes, 1 hour, or 1 day). In some implementations, the details window 332 further includes an update affordance (not shown) to enable a user to request an updated data visualization. In some implementations, the dashboard asset 315 only shows data and analytics for which the user has share permissions (e.g., as established within the data analysis application).

Figure 3D:
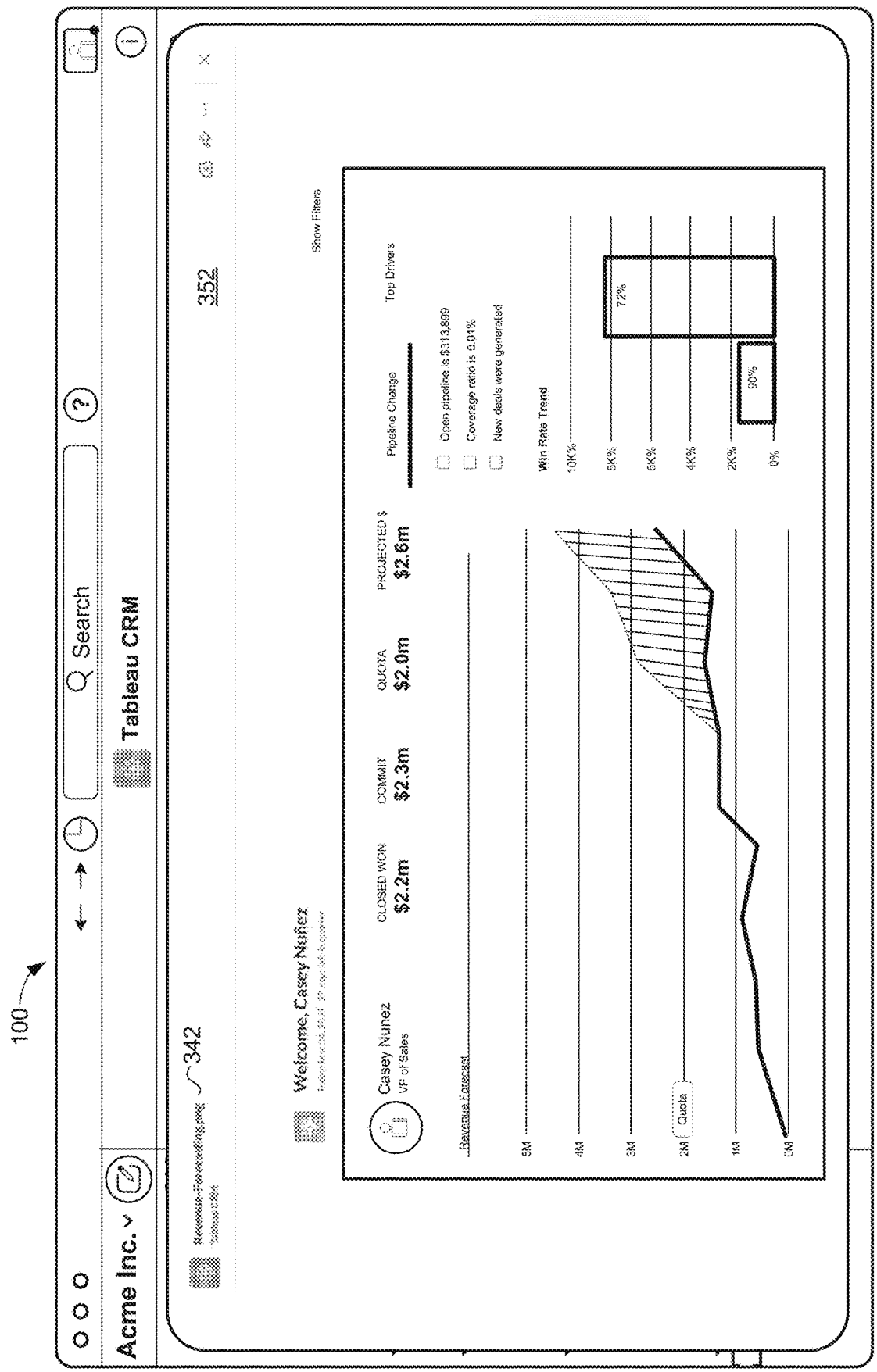

FIG. 3D shows a data visualization window 352 displayed in response to the user selecting the data visualization 342 illustrated in FIG. 3C (e.g., the user clicks on the graph in FIG. 3C). In accordance with some implementations, FIG. 3D is an enlarged view of the graph illustrated in FIG. 3C. In some implementations, the data visualization window 352 includes additional details not shown in the data visualization 342. In some implementations, selection of the data visualization 342 initiates an update to the data visualization such that the data visualization window 352 includes updated data as compared to the data visualization 342.

In some implementations, the details window 332 and/or the data visualization window 352 includes an affordance to open or launch the data analysis application (e.g., the linked application 110) so that the user may view and interact with the data within the data analysis application. In this way, the user is able to open the data analytics application to take a closer look at any of the information presented in the details window 332 or the data visualization window 352.

Figure 3E:
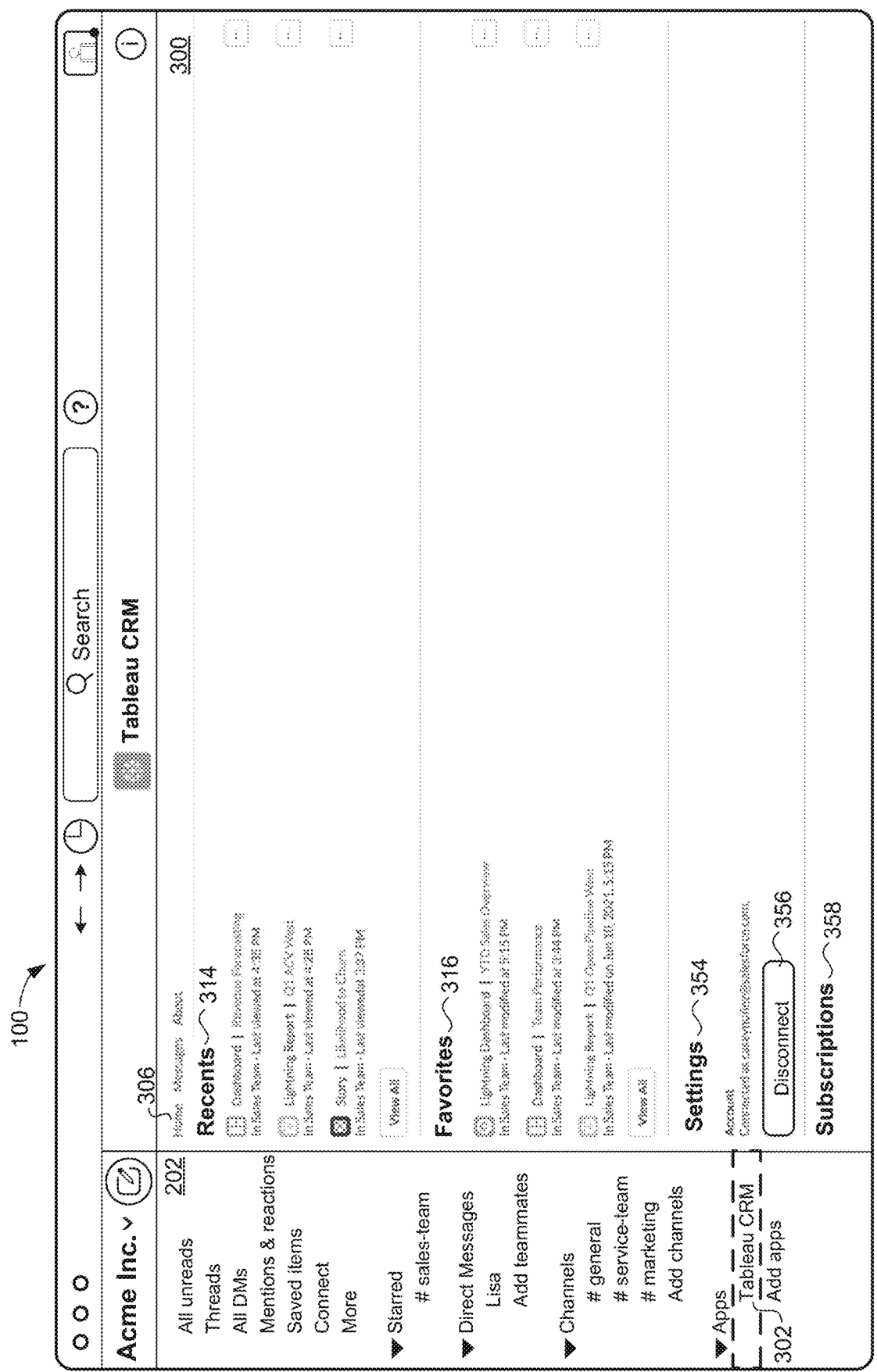

FIG. 3E illustrates that the application view 300 includes a settings section 354 and a subscriptions section 358 in accordance with some implementations. For example, FIG. 3E corresponds to the user having closed the data visualization window 352 and the details window 332 and scrolled down within the application view 300. The settings section 354 includes information about the user's account and a disconnect affordance 356 to disconnect the user's linked application 110 account from the communications application. The subscriptions section 358 includes information about the user's current subscriptions, e.g., information about the digest shown in FIG. 2A.

Figure 3F:
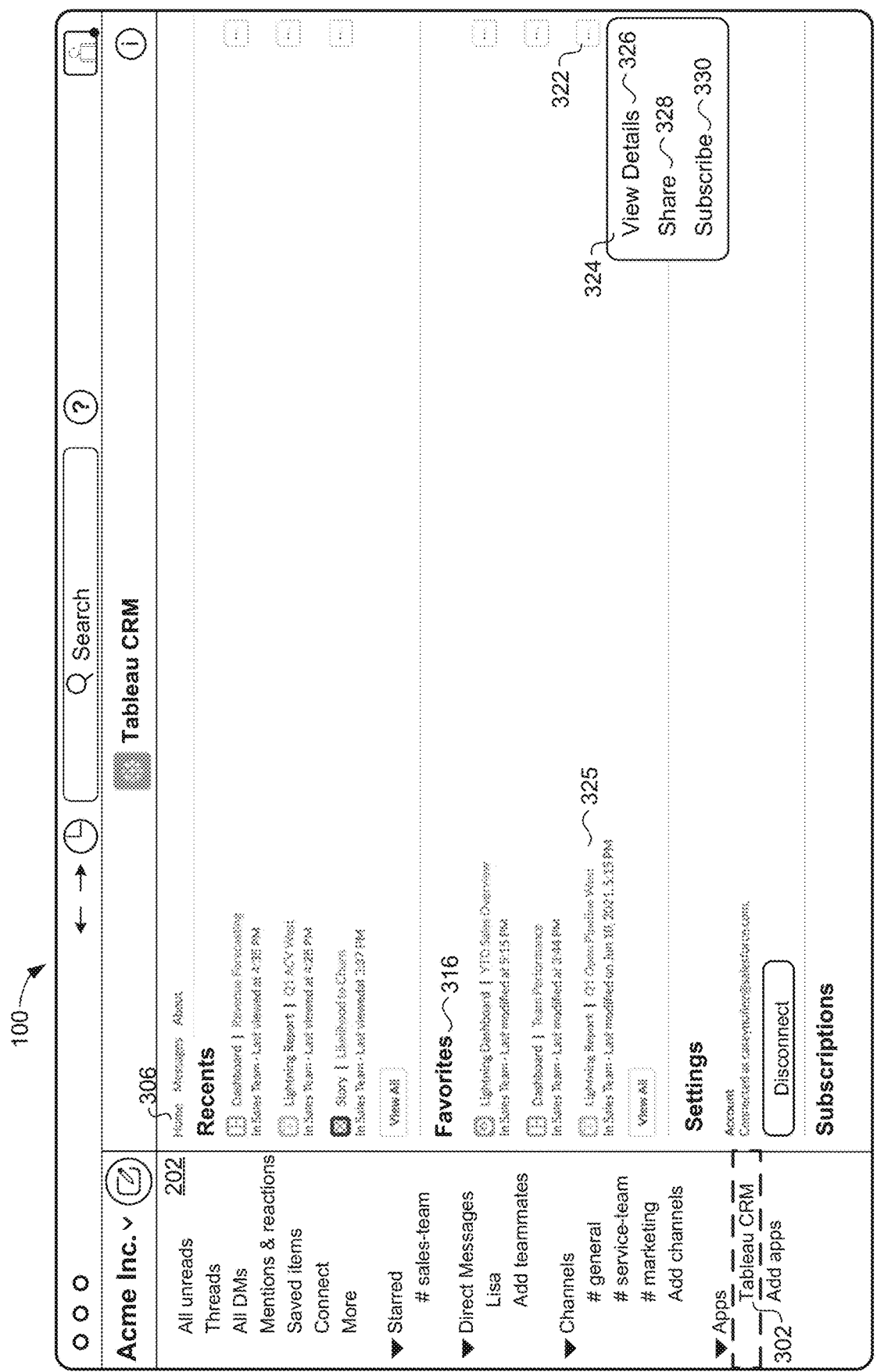

FIG. 3F illustrates the user selecting the menu affordance 322 for the "Lightning Report" asset 325 in the favorites section 316, e.g., for the user to view "Q1 Open Pipeline West" open opportunities for the quarter. In response to selection of the menu affordance 322, the asset menu 324 is displayed.

Figure 3G:
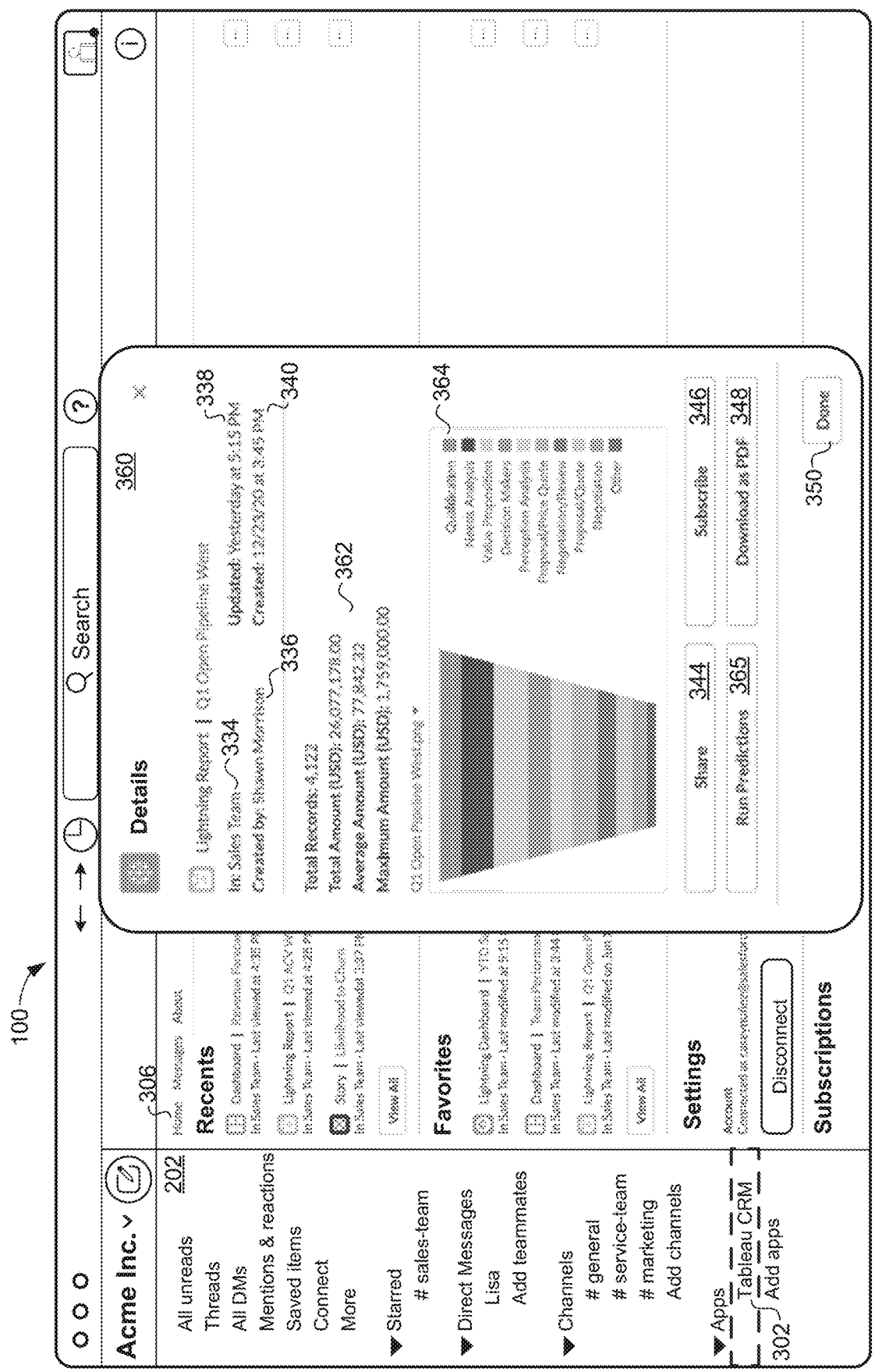

The details window 360 in FIG. 3G is displayed in response to the user selecting the view details affordance 326 in FIG. 3F. The details window 360 includes metadata for the asset 325, such as the team information 334, the creator information 336, the creation date information 340, and the update date information 338. The details window 360 also includes data metrics 362 and a data visualization 364, e.g., the Q1 Open Pipeline West.png, and a plurality of affordances. In accordance with some implementations, the plurality of affordances includes a share button 344, a subscribe button 346, a download button 348, a done affordance 350, and a predictions button 365. Thus, FIG. 3G illustrates that the user is enabled to "Run Predictions" (e.g., generated using artificial intelligence) for the asset 325 directly from within the communications application (e.g., without having to open or navigate to a separate application). In some implementations, the communications application executes a version of the data analysis application in a headless browser to run the predictions and captures the results for display to the user.

Figure 3H:
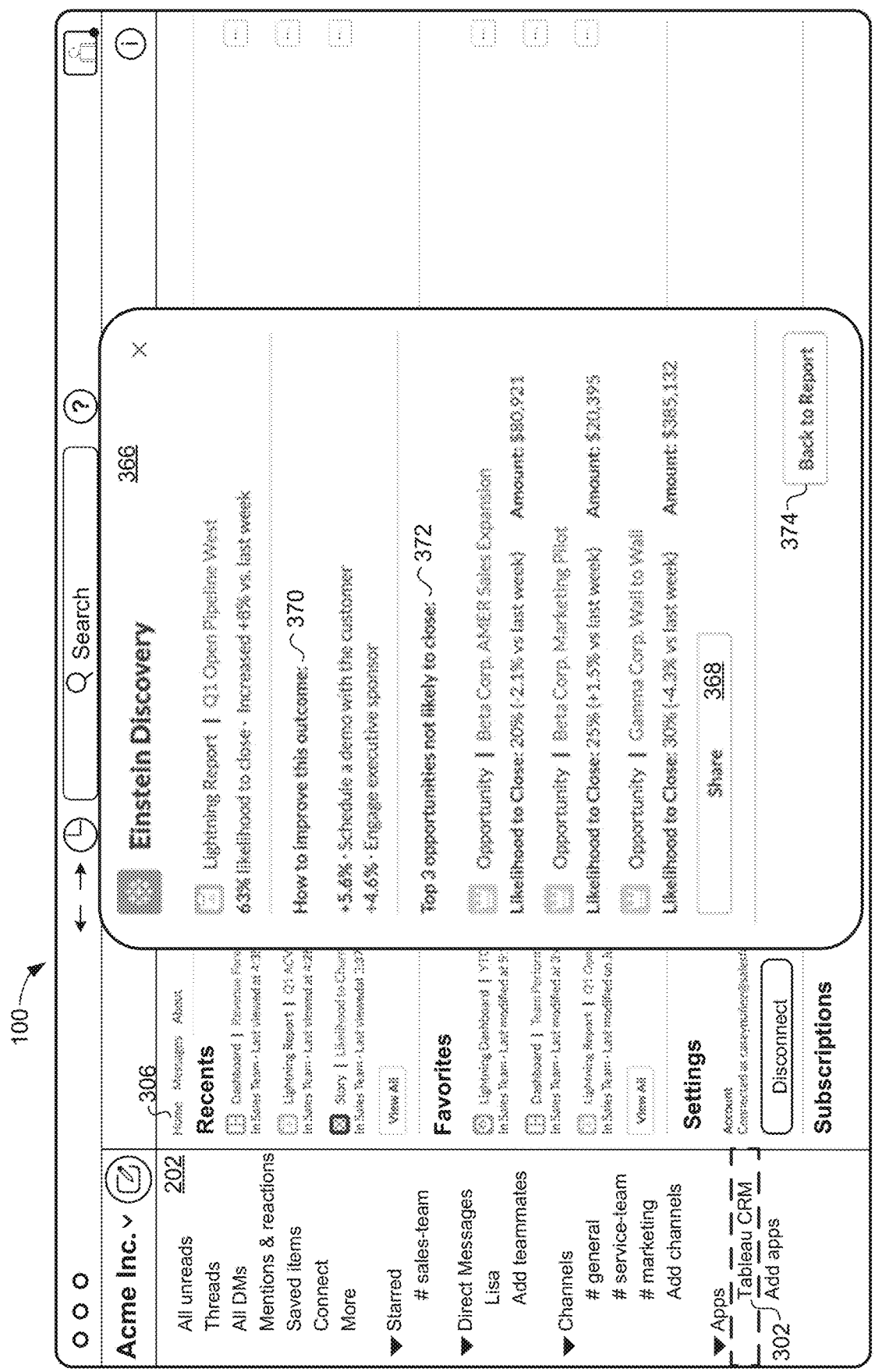

The discovery window 366 in FIG. 3H is displayed in response to the user selecting the predictions button 365 in FIG. 3G. The discovery window 366 includes recommendations 370 to assist the user with improving the outcome, e.g., closing some of the open opportunities described in the details window 360. The discovery window 366 also includes insights 372 to assist the user with understanding aspects of the data, e.g., the opportunities not likely to close in the quarter. The discovery window 366 also includes a share button 368 to share the recommendations 370 and insights 372 with other users, and a back button 374 to return the user to the details window 360 shown in FIG. 3G. In some implementations, the recommendations 370 and insights 372 are generated using a machine learning algorithm. In some implementations, the machine learning algorithm is part of the linked application 110. In some implementations, the communications application calls the machine learning algorithm e.g., the algorithm is executed by the communications application without launching the linked application 110.

Figure 3I:
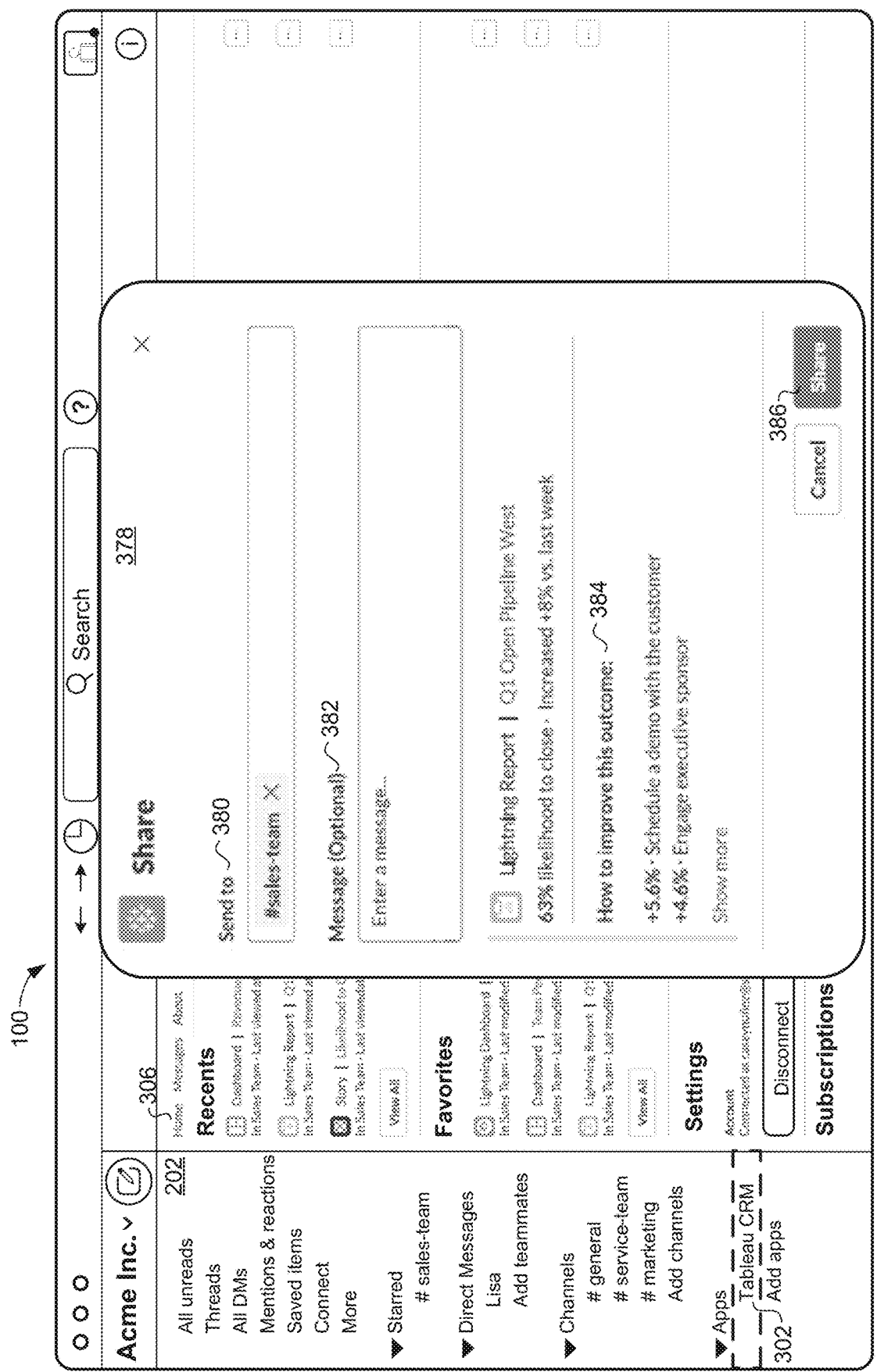
Figure 3J:
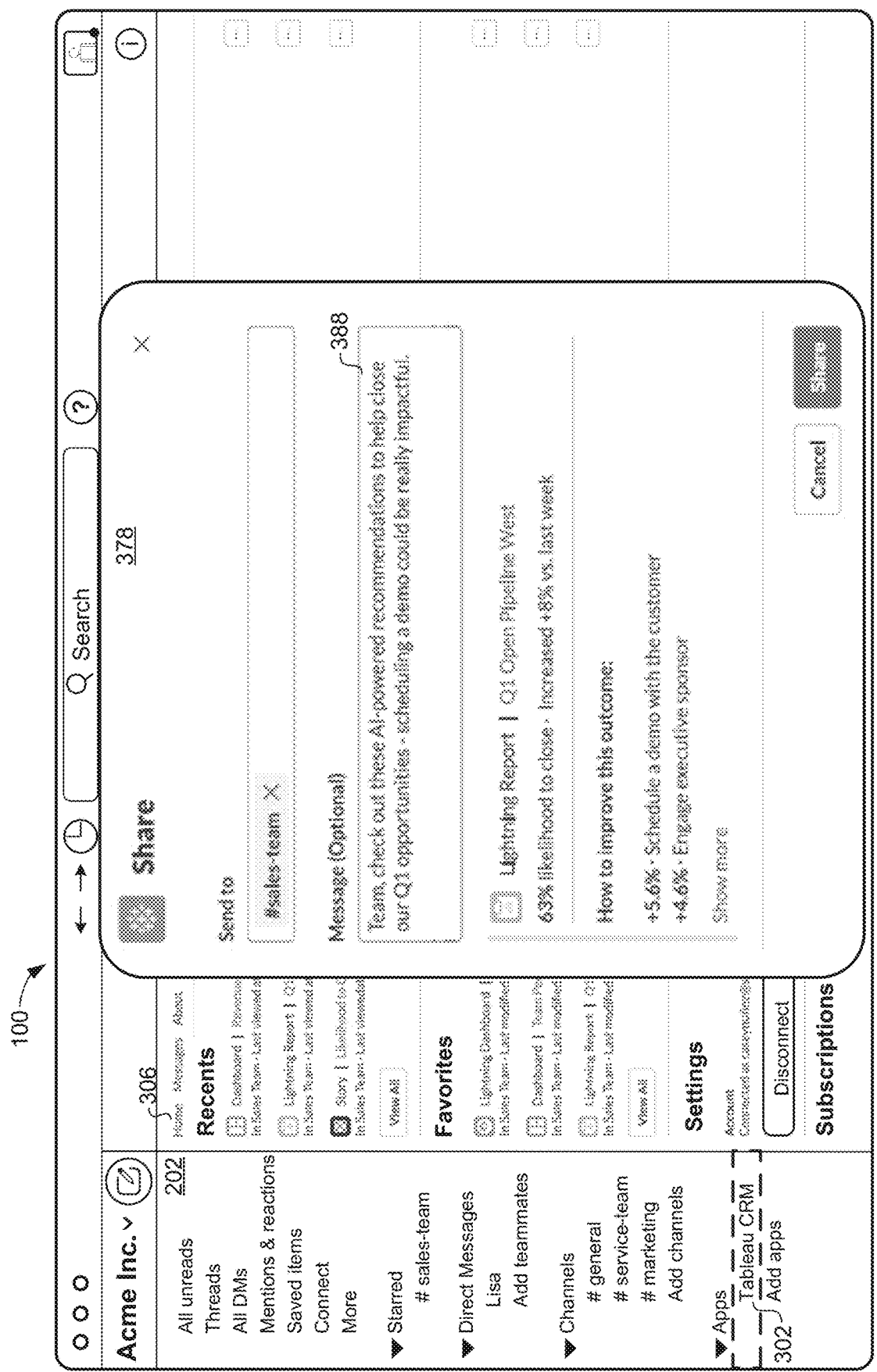

FIGS. 3I-3J illustrate a sharing window 378 displayed in response to the user selecting the share button 368 in FIG. 3G. The sharing window 378 includes a recipients section 380 where the user selects with whom to share the report (e.g., sales-team). The sharing window 378 further includes an optional message section 382 for the user to add a text message with the information from the discovery window 366. The sharing window 378 also shows a preview 384 of the information to be included in the shared message and a share button 386. FIG. 3J illustrates the user inputting a message 388 in the message section 382.

Figure 3K:
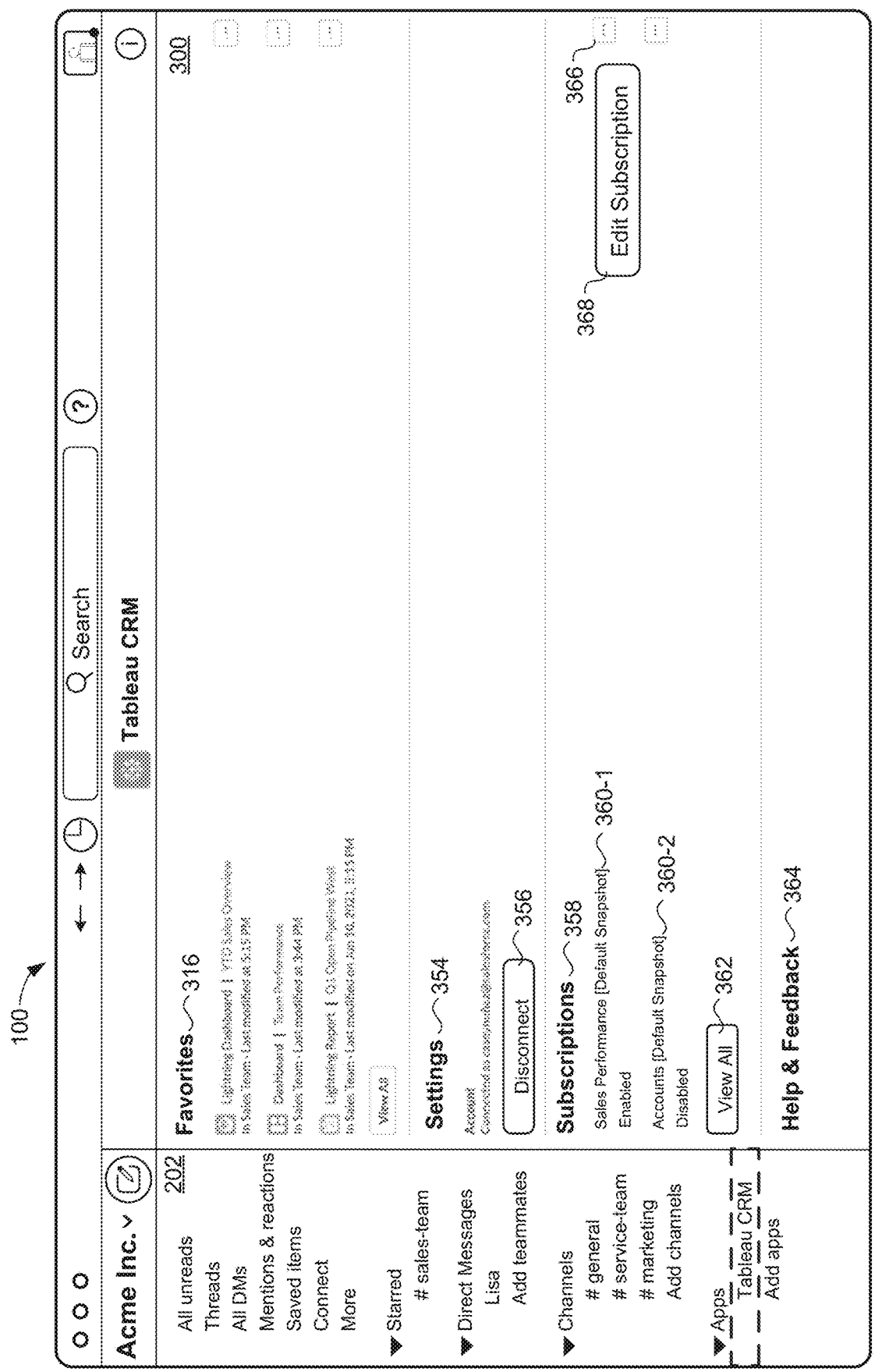

FIG. 3K illustrates that the application view 300 includes the favorites section 316, the subscriptions section 358, and a help section 364 in accordance with some implementations. For example, the application view 300 shown in FIG. 3K is an alternative to the application view 300 shown FIG. 3E, where the recents section 314 is not included and the help section 364 is included. The subscriptions section 358 in FIG. 3K includes information about current subscriptions of the user, including subscriptions 360-1 and 306-2, and a view all affordance 362. In some implementations, user selection of the view all affordance 362 causes a window to be displayed with a complete list of the user's current subscriptions. The subscription 360-1 in FIG. 3K is for a default snapshot of the Sales Performance analytic asset, and is enabled. The subscription 360-2 in FIG. 3K is for a default snapshot of the Accounts analytic asset, and is disabled. FIG. 3K further shows a menu affordance 366 for the subscription 360-1 and a corresponding edit subscription option 368 to edit parameters of the subscription 360-1.

Figure 3L:
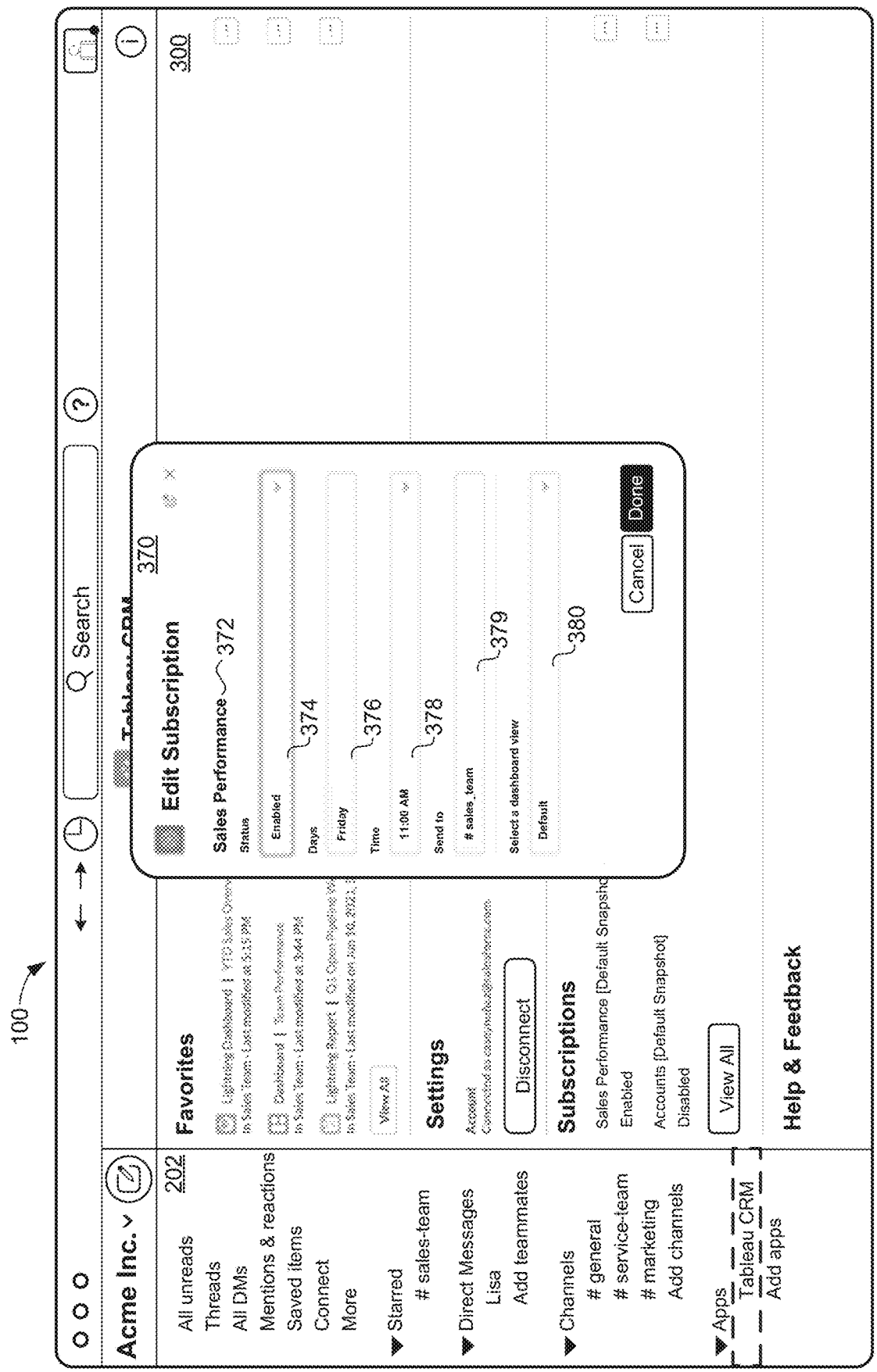

FIG. 3L shows an edit subscription window 370 for the Sales Performance analytic asset. For example, the edit subscription window 370 in FIG. 3L is displayed in response to the user selecting the edit subscription option 368 in FIG. 3K. The edit subscription window 370 includes a title 372 for the subscription 360-1, a status affordance 374 for enabling and disabling the subscription, a days affordance 376 for selecting reporting days for the subscription, a time affordance 378 for selecting a time for the reporting of the subscription, a send to affordance 379 for selecting recipients of the subscription 360-1, and a dashboard view affordance 380 for selecting dashboard view options. In some implementations, the recipients of the subscription include individual users (e.g., the user Casey Nunez) and teams (e.g., the sales team).

Figure 3M:
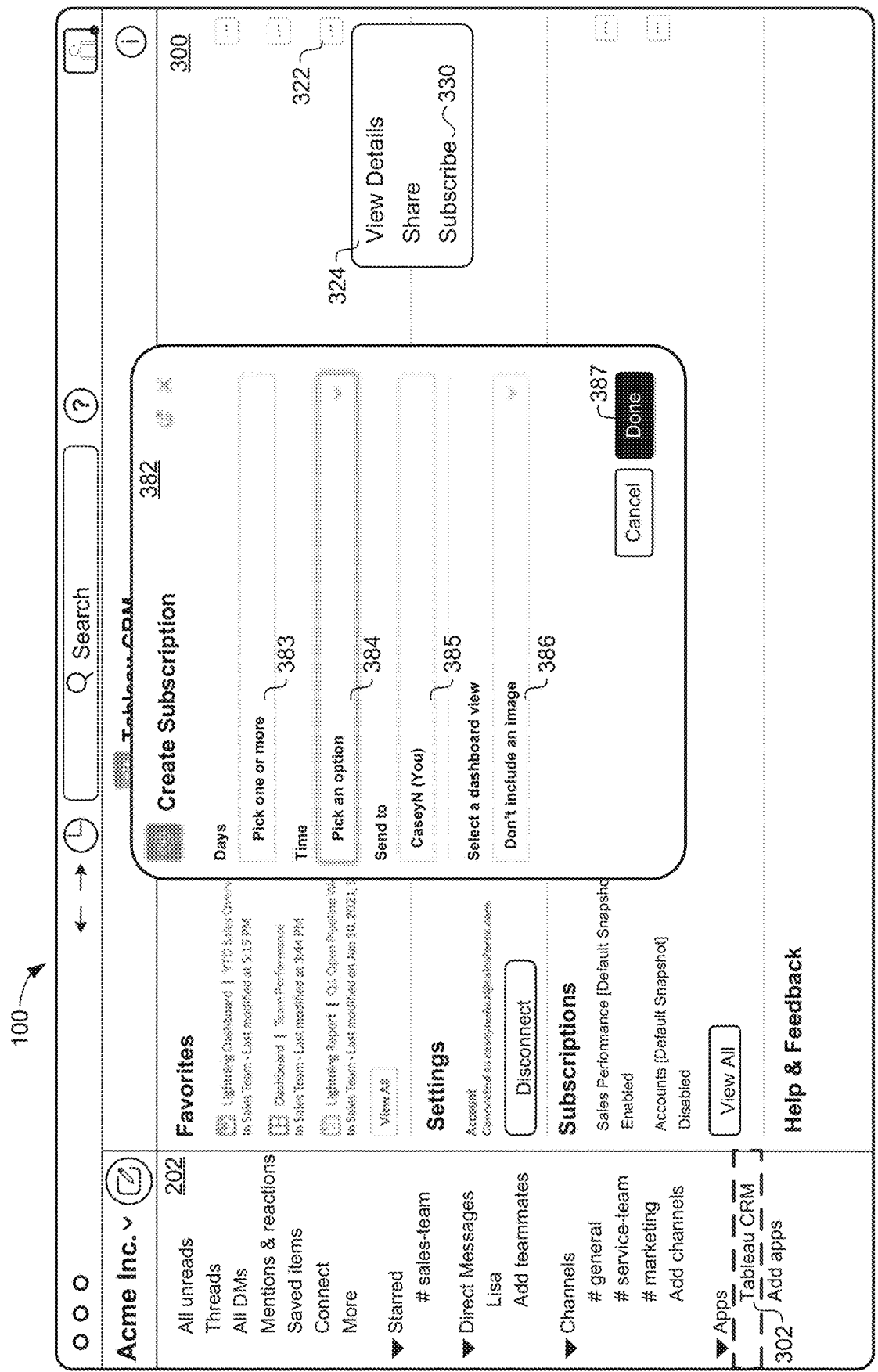

FIG. 3M shows a create subscription window 382 for the Q1 Open Pipeline West analytic asset. For example, the create subscription window 382 in FIG. 3M is displayed in response to the user selecting the subscribe affordance 330 from within the menu 324 corresponding to the menu affordance 322 for the Q1 Open Pipeline West asset. The create subscription window 382 includes a days affordance 383 for selecting reporting days for the subscription, a time affordance 384 for selecting a time for the reporting of the subscription, a send to affordance 385 for selecting recipients of the subscription, and a dashboard view affordance 386 for selecting dashboard view options for the subscription. In some implementations, selection of the done affordance 387 causes a new subscription to be created and included in the subscriptions section 358. In some implementations, the send to affordance 385 includes a default option of having the subscription sent to the user.

Figure 3N:
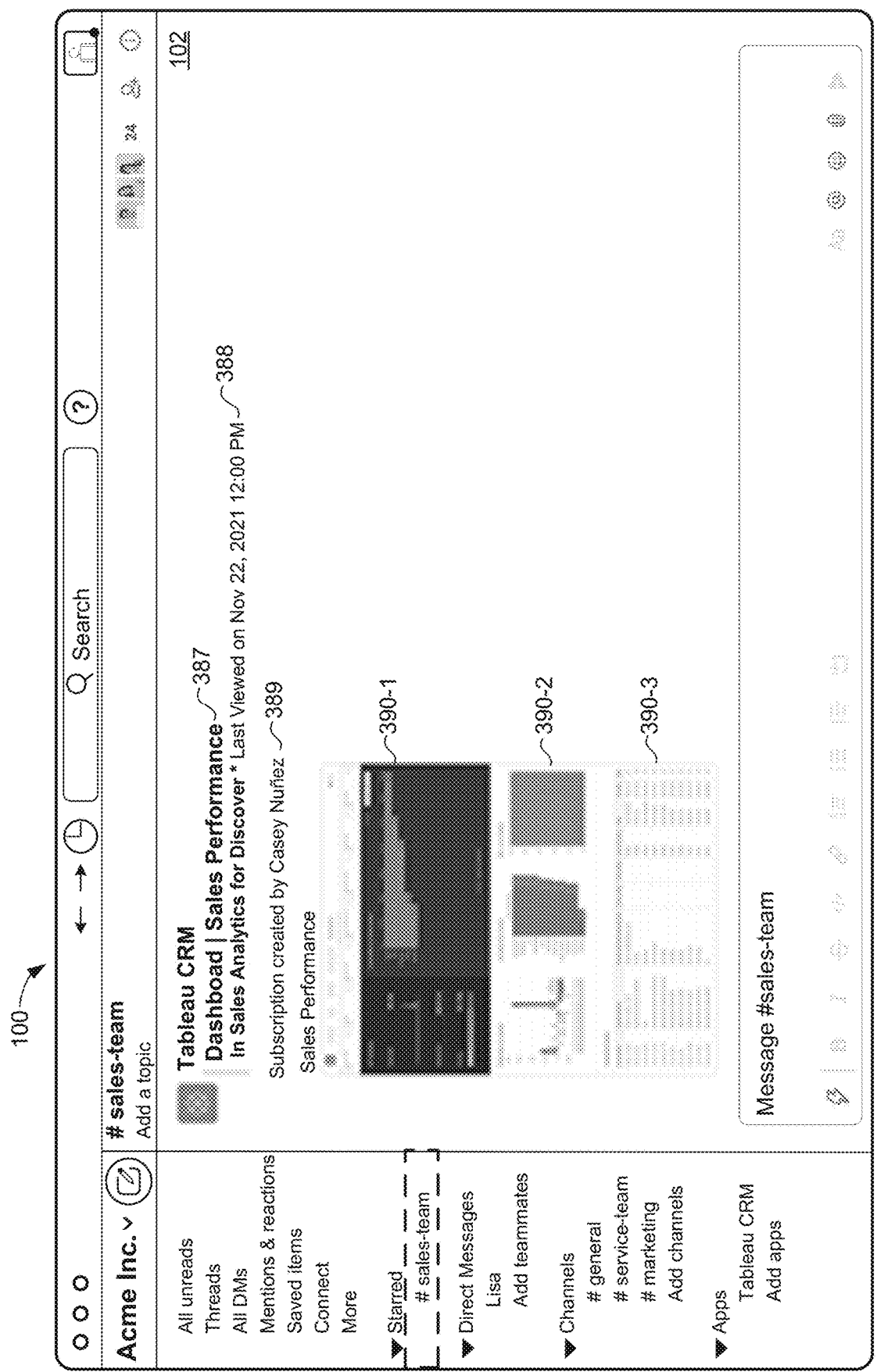

FIG. 3N illustrates a subscription report 387 displayed on the channel 102 for the sales team. For example, the subscription report 387 corresponds to the subscription 360-1 shown in FIG. 3K. FIG. 3N further shows that the sales-team channel 102 is active and selected in the navigation tab. In some implementations, the subscription report 387 is pushed (e.g., automatically without user input) to a team channel on a predefined schedule, e.g., as setup in the edit subscription window 370 of FIG. 3L. In some implementations, the content of the subscription report is based on the state of the data at the time the report is generated. For example, the report includes information on performance metrics that are currently outside of expected ranges. In some implementations, the content of the report is selected by the creator while setting up the report (e.g., via the dashboard view affordance 380). FIG. 3N further shows the subscription report 387 including metadata 388, creator information 389, and dashboard views 390 (390-1, 390-2, and 390-3) in accordance with some implementations. In some implementations, the subscription report 387 includes one or more dashboard views that are automatically selected based on a state of the underlying data. In some implementations, one or more of the dashboard views 390 includes highlighting or emphasis that is automatically selected based on a state of the underlying data.

Figure 4A:
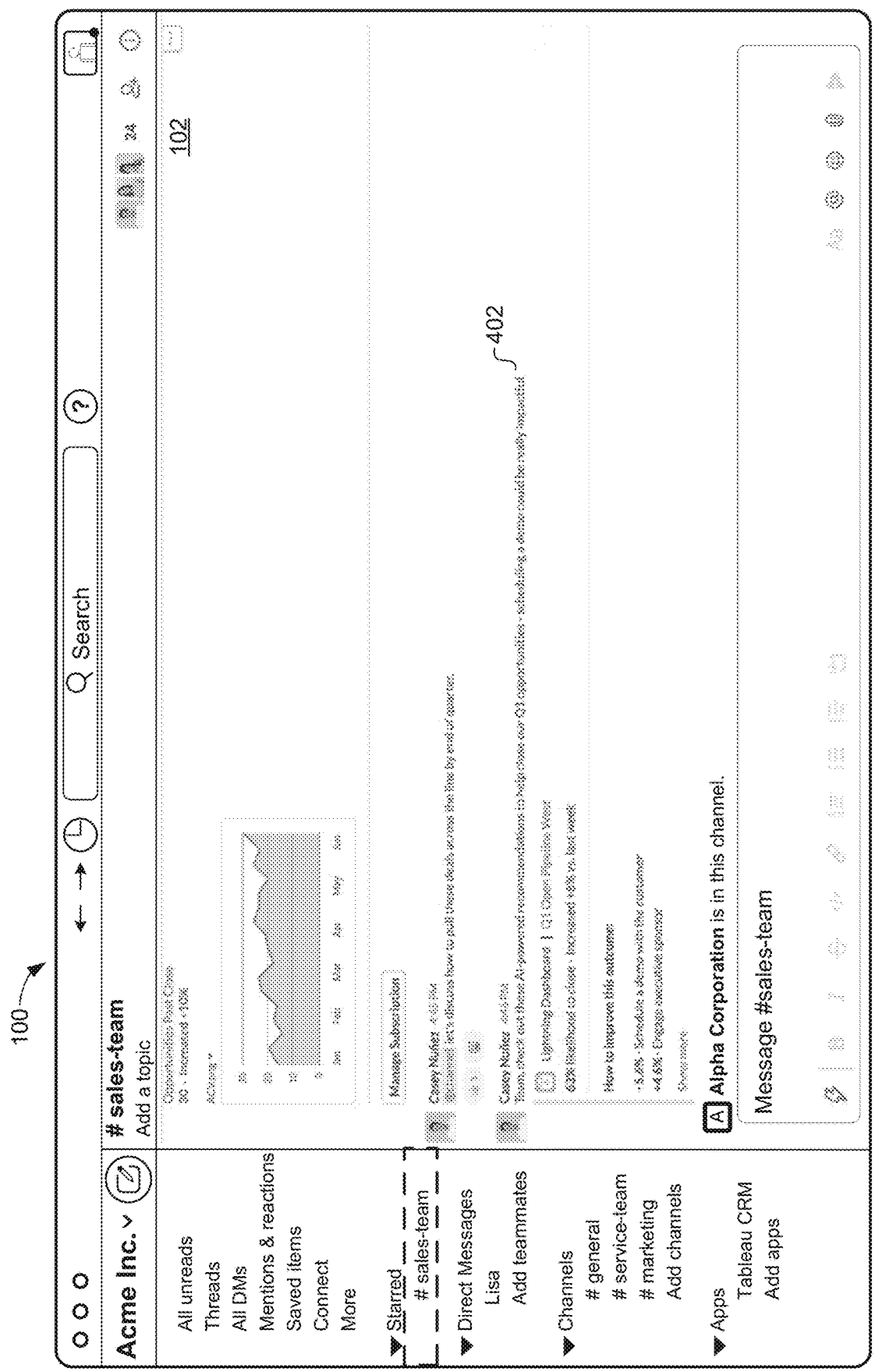

FIGS. 4A-4D illustrate example user interactions with the graphical user interface 100 in accordance with some implementations. FIG. 4A shows the graphical user interface 100 including the communications channel 102 in accordance with some implementations. As shown in FIG. 4A, information from the user's discovery window 366 has been shared into the communications channel 102 in response to the user selecting the share button 386 in FIG. 3J. The user's report and optional message that the user shared from the "Tableau CRM" linked application 110 view is now displayed on the communications channel 102 for the sales-team as message 402. For example, the message 402 includes the user's recommendations 370 from FIG. 3G.

Figure 4B:
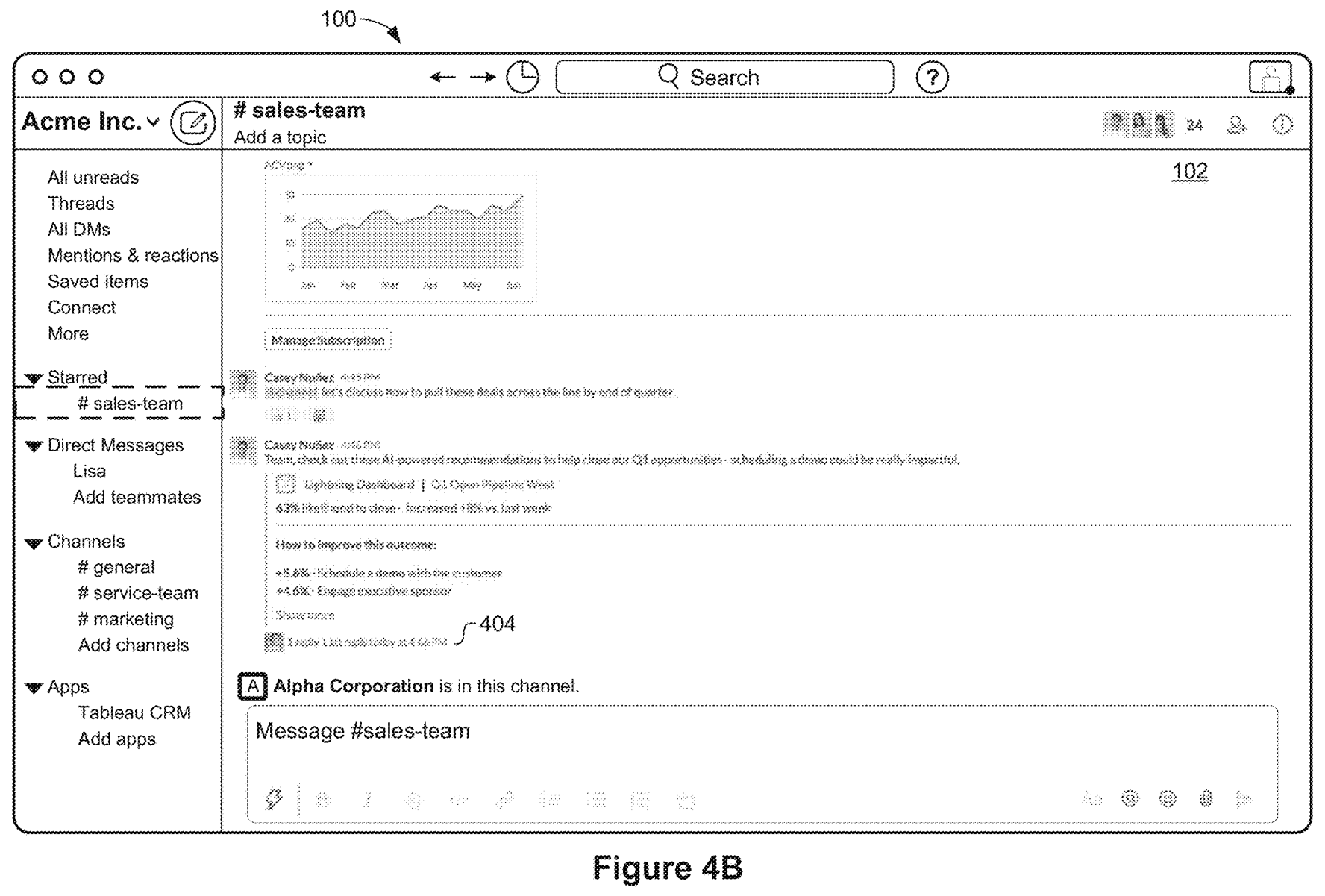
Figure 4C:
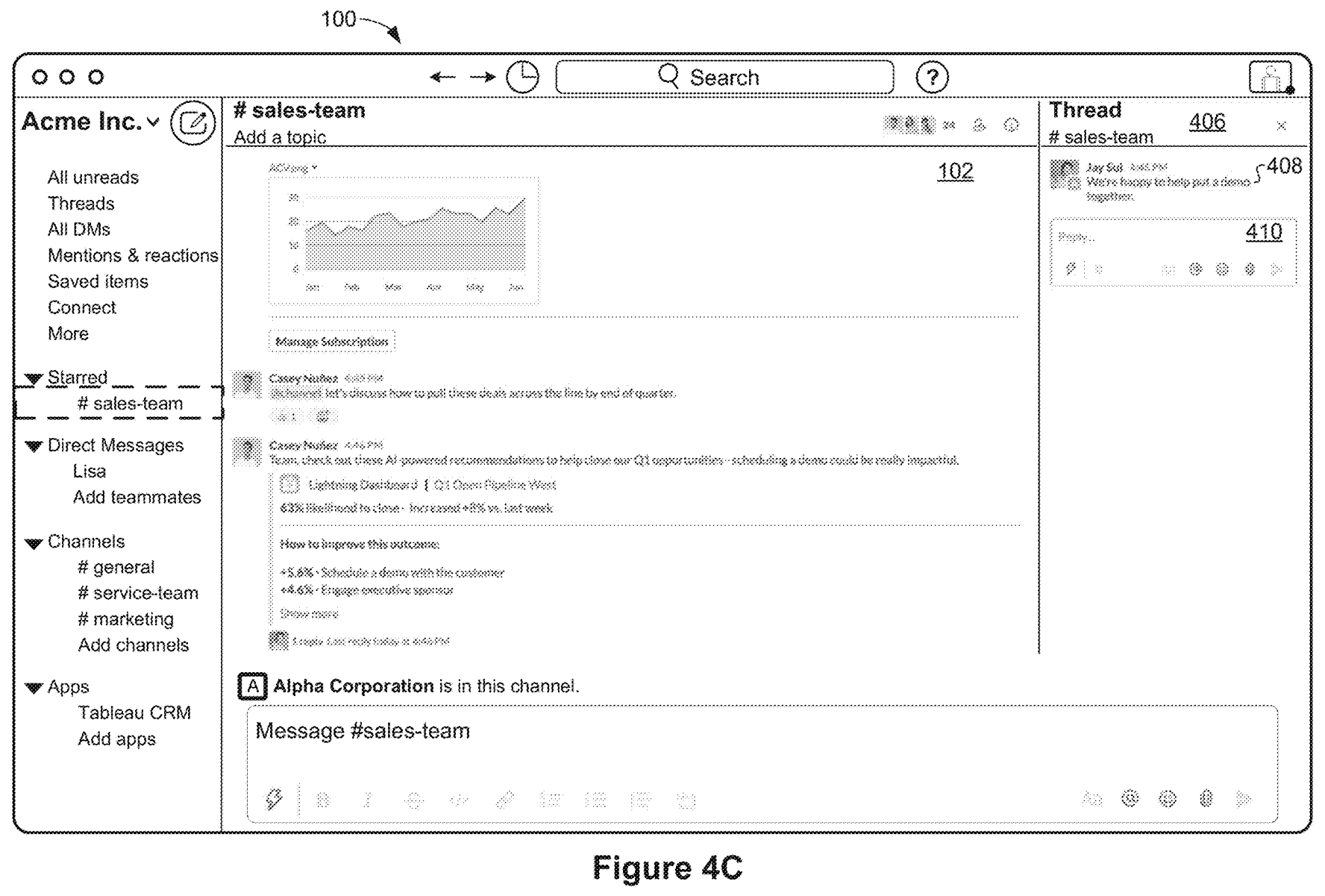
Figure 4D:
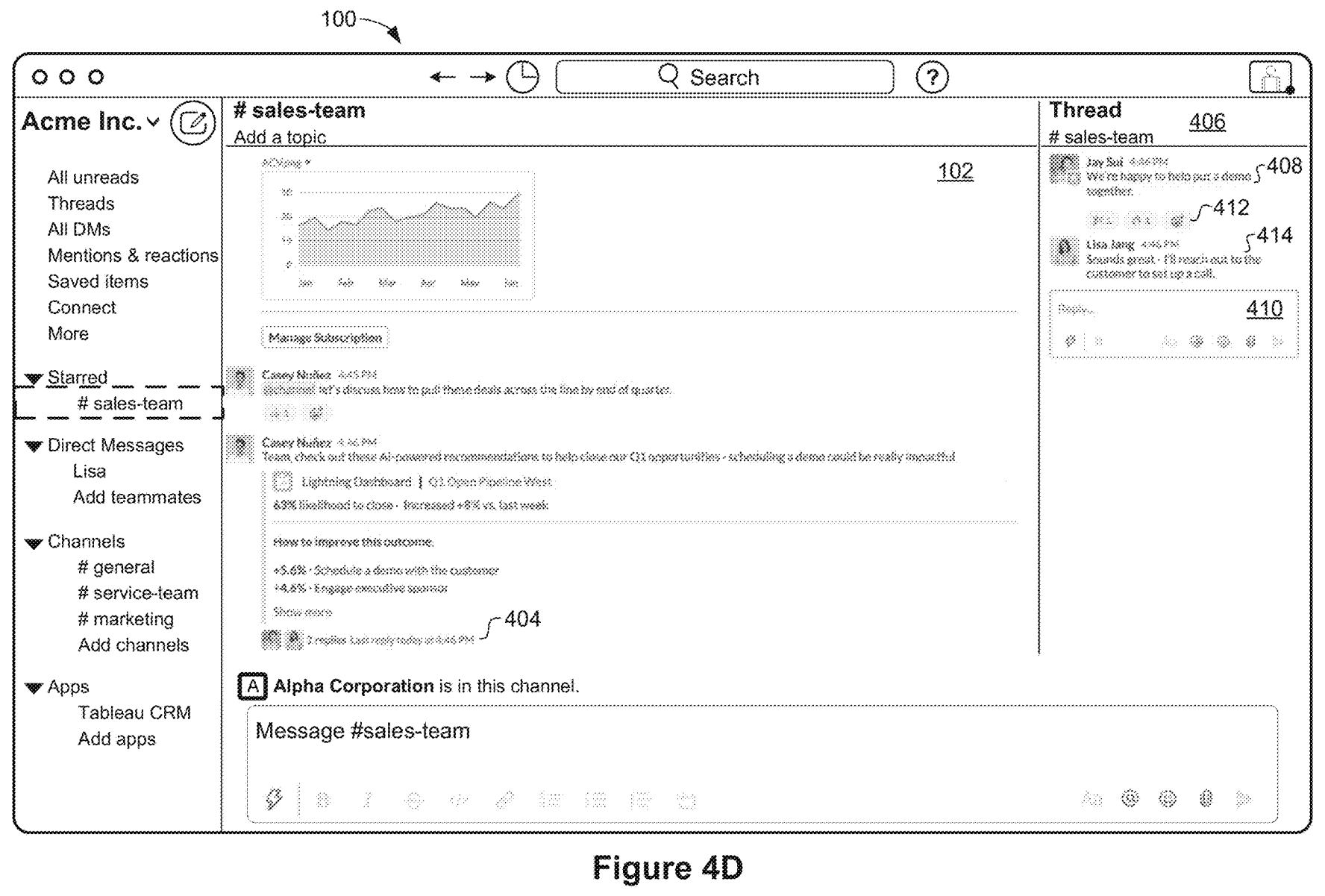

FIG. 4B shows a reply indicator 404 by a team member to the message 402, e.g., as indicated by "1 reply." In some implementations, the reply is displayed in a message thread section, e.g., the message thread section 406 in FIG. 4C. In some implementations, the thread is updated in real-time such that users (e.g., members of sales-team) are enabled to communicate (e.g., comment on, message, react, etc.) about shared reports and analytics that are shared as an integrated post within the communications application. Thus, users of the team are enabled to seamlessly communicate about specific data and analytics directly from the communications application without having to navigate to separate data analysis applications. For example, FIG. 4C shows Jay Sui replied to the shared "Lightning Dashboard" and his message 408 is displayed in the thread section 406 along with a thread data entry box 410. In some implementations, the thread section 406 is displayed in a separate window (e.g., a pop-up window). FIG. 4D illustrates additional reactions 412 (e.g., from other team members) that are posted to Jay Sui's reply message 408. FIG. 4D further shows a second text reply message 414 from Lisa Jang in the thread and reply indicator 404 has been updated accordingly.

Figure 5A:
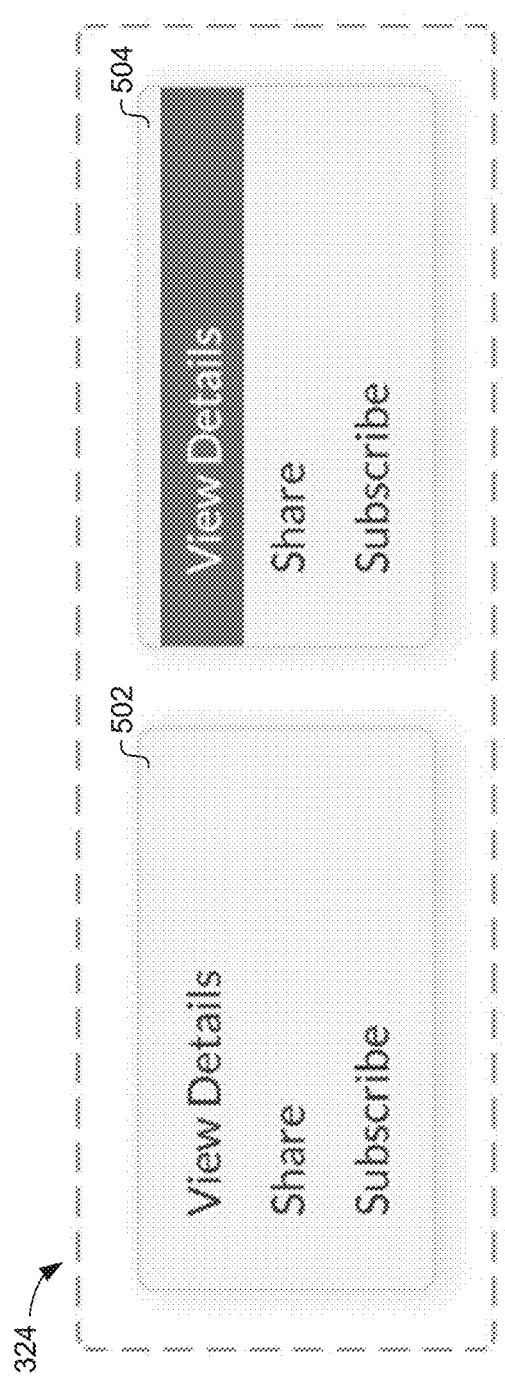
FIG. 5A-5B illustrates example states of menus of a communications application in accordance with some implementations.

FIG. 5A illustrates two states 502 and 504 of the asset menu 324 in accordance with some implementations. The first state 502 of the asset menu 324 shows the menu 324 without any of the affordances selected by a user. The second state 504 of the asset menu 324 shows the menu 324 with the view details affordance selected. In some implementations, the second state 504 corresponds to the user selecting (e.g., clicking on) the view details affordance. In some implementations, the second state 504 corresponds to the user highlighting (e.g., hovering a cursor over) the view details affordance. The first state 512 of the asset menu 510 shows the menu 510 without any of the affordances selected by a user. The second state 514 of the asset menu 510 shows the menu 510 with the view details affordance 326 selected.

Figure 5B:
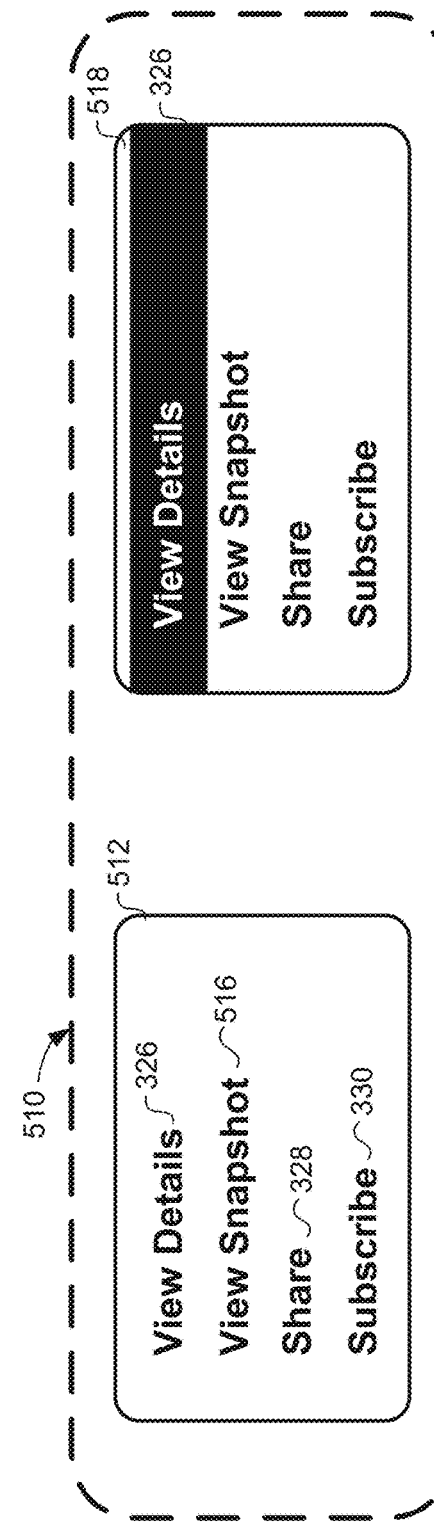

FIG. 5B illustrates two states 512 and 514 of an asset menu 510 in accordance with some implementations. The asset menu 510 is similar to the asset menu 324, except that it includes a view snapshot affordance 516 in addition to the view details affordance 326, the share affordance 328, and the subscribe affordance 330.

Figure 5C:
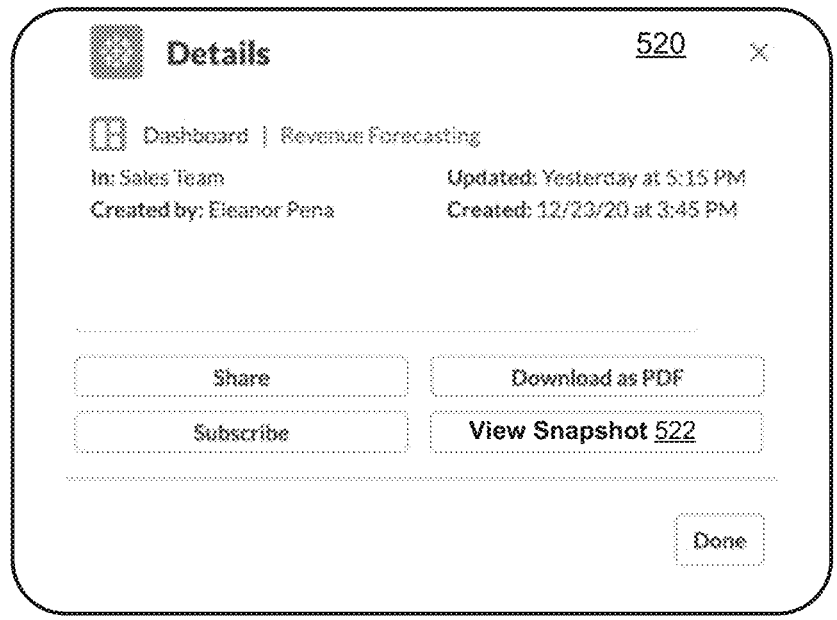
FIGS. 5C-5D illustrate example windows of a communications application in accordance with some implementations.

FIG. 5C illustrates a details window 520 in accordance with some implementations. For example, the details window 520 is displayed in response to a user selecting the view details affordance 326 in FIG. 5B. The details window 520 is similar to the details window 332 in FIG. 3C, except that it does not include the data visualization 342, e.g., the image Revenue-Forecasting.png. The details window 520 also includes the view snapshot affordance 522.

Figure 5D:
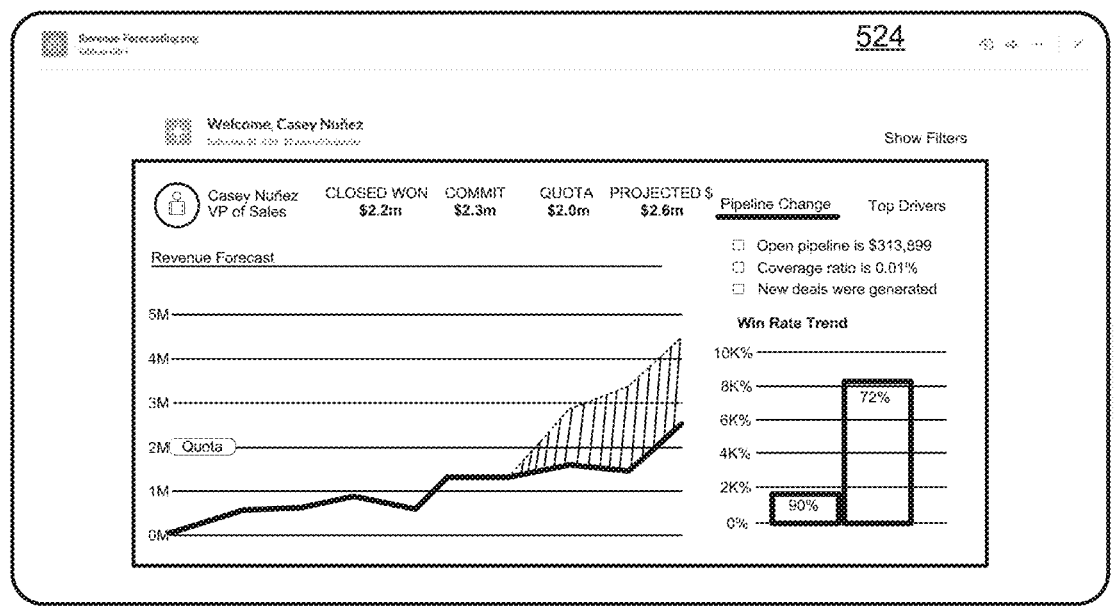

FIG. 5D illustrates a data visualization window 524 in accordance with some implementations. For example, the data visualization window 524 is displayed in response to a user selecting the view snapshot affordance 516 in FIG. 5B, or a user selecting the view snapshot affordance 522 in FIG. 5C. In some implementations, the data visualization window 524 includes a plurality of data visualizations (e.g., a plurality of images) for the corresponding analytic asset. In some implementations, selection of the view snapshot affordance 516 or 522 causes a new visualization to be generated (e.g., via a headless browser) such that the visualization represents the current state of the data. In some implementations, the details window 520 and/or the data visualization window 524 includes an affordance to open or execute the data analysis application (e.g., the linked application 110) so that the user may view and interact with the data within the data analysis application. In this way, the user is able to open the data analytics application to take a closer look at any of the information presented in the details window 520 or the data visualization window 524.

Figure 6:
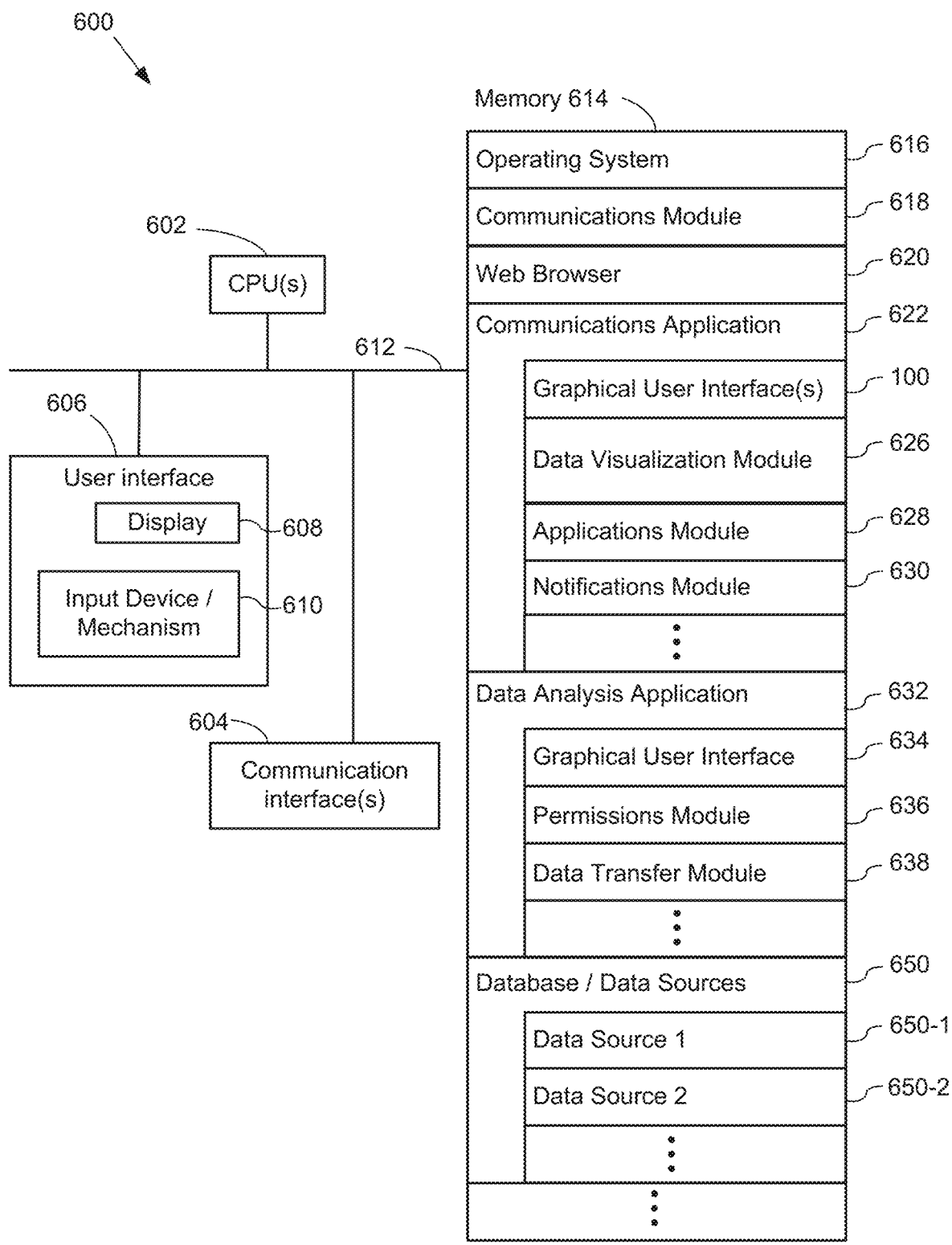
FIG. 6 is a block diagram of an example computing device in accordance with some implementations.

FIG. 6 is a block diagram of a computing device 600 in accordance with some implementations. FIG. 6 illustrates a computing device 600 capable of displaying the graphical user interface 100 in accordance with some implementations. Various examples of the computing device 600 include a desktop computer, a laptop computer, a tablet computer, and other computing devices that have a display and a processor capable of running a communications application 622. The computing device 600 typically includes one or more processing units/cores (CPUs) 602 for executing modules, programs, and/or instructions stored in the memory 614 and thereby performing processing operations; one or more network or other communications interfaces 604; memory 614; and one or more communication buses 612 for interconnecting these components. The communication buses 612 may include circuitry that interconnects and controls communications between system components.

The computing device 600 includes a user interface 606 comprising a display device 608 and one or more input devices or mechanisms 610. In some implementations, the input device/mechanism includes a keyboard. In some implementations, the input device/mechanism includes a "soft" keyboard, which is displayed as needed on the display device 608, enabling a user to "press keys" that appear on the display 608. In some implementations, the display 608 and input device/mechanism 610 comprise a touch screen display (also called a touch sensitive display).

In some implementations, the memory 614 includes high-speed random-access memory, such as DRAM, SRAM, DDR RAM or other random-access solid-state memory devices. In some implementations, the memory 614 includes non-volatile memory, such as one or more magnetic disk storage devices, optical disk storage devices, flash memory devices, or other non-volatile solid state storage devices. In some implementations, the memory 614 includes one or more storage devices remotely located from the CPU(s) 602. The memory 614, or alternately the non-volatile memory device(s) within the memory 614, comprises a non-transitory computer readable storage medium. In some implementations, the memory 614, or the computer readable storage medium of the memory 614, stores the following programs, modules, and data structures, or a subset thereof:

- an operating system 616, which includes procedures for handling various basic system services and for performing hardware dependent tasks;
- a communications module 618, which is used for connecting the computing device 600 to other computers and devices via the one or more communication network interfaces 604 (wired or wireless) and one or more communication networks, such as the Internet, other wide area networks, local area networks, metropolitan area networks, and so on;
- a web browser 620 (or other application capable of displaying web pages), which enables a user to communicate over a network with remote computers or devices;
- a communications application 622, which provides a graphical user interface 100 for a user to communicate with other users. For example, a user communicates with other uses via one or more channels or in direct message. The communications application 622 includes a data visualization module 626, which takes the user input and obtains a corresponding visual graphic (also referred to as a "data visualization"). The data visualization module 626 then displays the generated visual graphic in the user interface 100. In some implementations, the communications application 622 executes within the web browser 620 or another application using web pages provided by a web server. The communications application 622 includes an applications module 628 for linking or integrating other applications into the communications application 622. In some implementations, the applications module 628 executes functions of the linked or integrated applications (e.g., without launching a separate standalone application). In some implementations, the applications module 628 executes a linked application in a headless browser and captures results from the headless browser. The communications application 622 includes a notifications module 630 for obtaining and presenting notifications to users. For example, the communications application 622 pulls (or receives) data from linked applications and presents users with notifications or alerts about the data;

- a data analysis application 632 (e.g., the linked application 110), which provides tools and a graphical user interface 634 to be used to help understand and analyze the data. For example, a user creates analytic assets and data visualizations from various data sources (e.g., data sources 650). The data analysis application 632 includes a permissions module 636, which authenticates users and applies permissions (e.g., read, write, and share permission) to user data and analytic assets. The data analysis application 632 displays the user's analytic assets and data visualizations in the user interface 634 or transfers them to other applications via data transfer module 638. The data analysis application 632 includes the data transfer module 638 for transferring data, data visualizations, and analytic assets to other applications (e.g., linked applications or applications requesting information with proper user credentials). In some implementations, the data transfer module 638 executes as a standalone application (e.g., a desktop application); and
- one or more databases or data sources 650 (e.g., a first data source 650-1 and a second data source 650-2), which are used by the communications application 622 and/or the data analysis application 632. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 614 stores a subset of the modules and data structures identified above. Furthermore, the memory 614 may store additional modules or data structures not described above.

Although FIG. 6 shows a computing device 600, FIG. 6 is intended more as a functional description of the various features that may be present rather than as a structural schematic of the implementations described herein. In practice, and as recognized by those of ordinary skill in the art, items shown separately could be combined and some items could be separated.

Figure 7A:
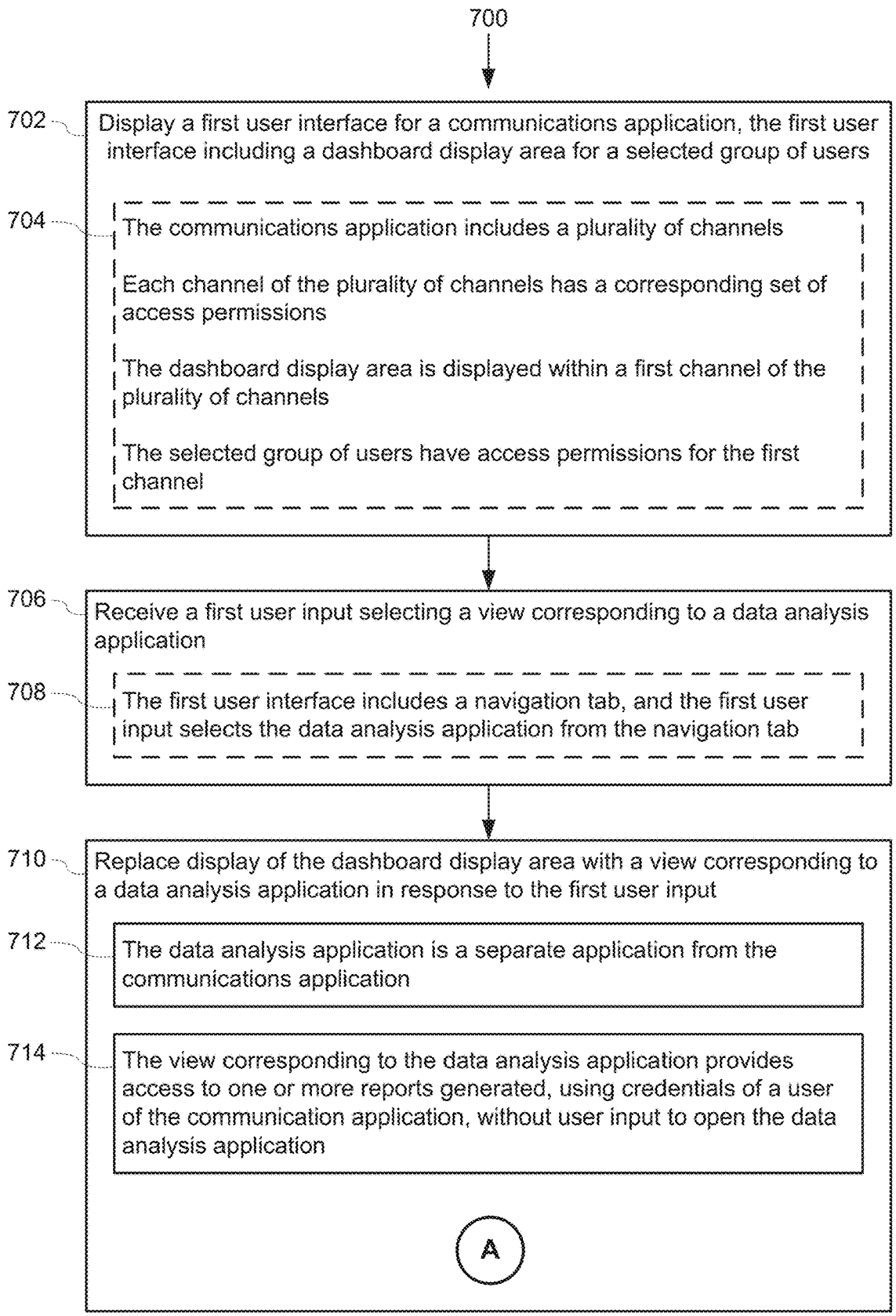
FIGS. 7A-7C provide a flowchart of an example process for using a communications application to analyze and distribute data analytics in accordance with some implementations.
Figure 7B:
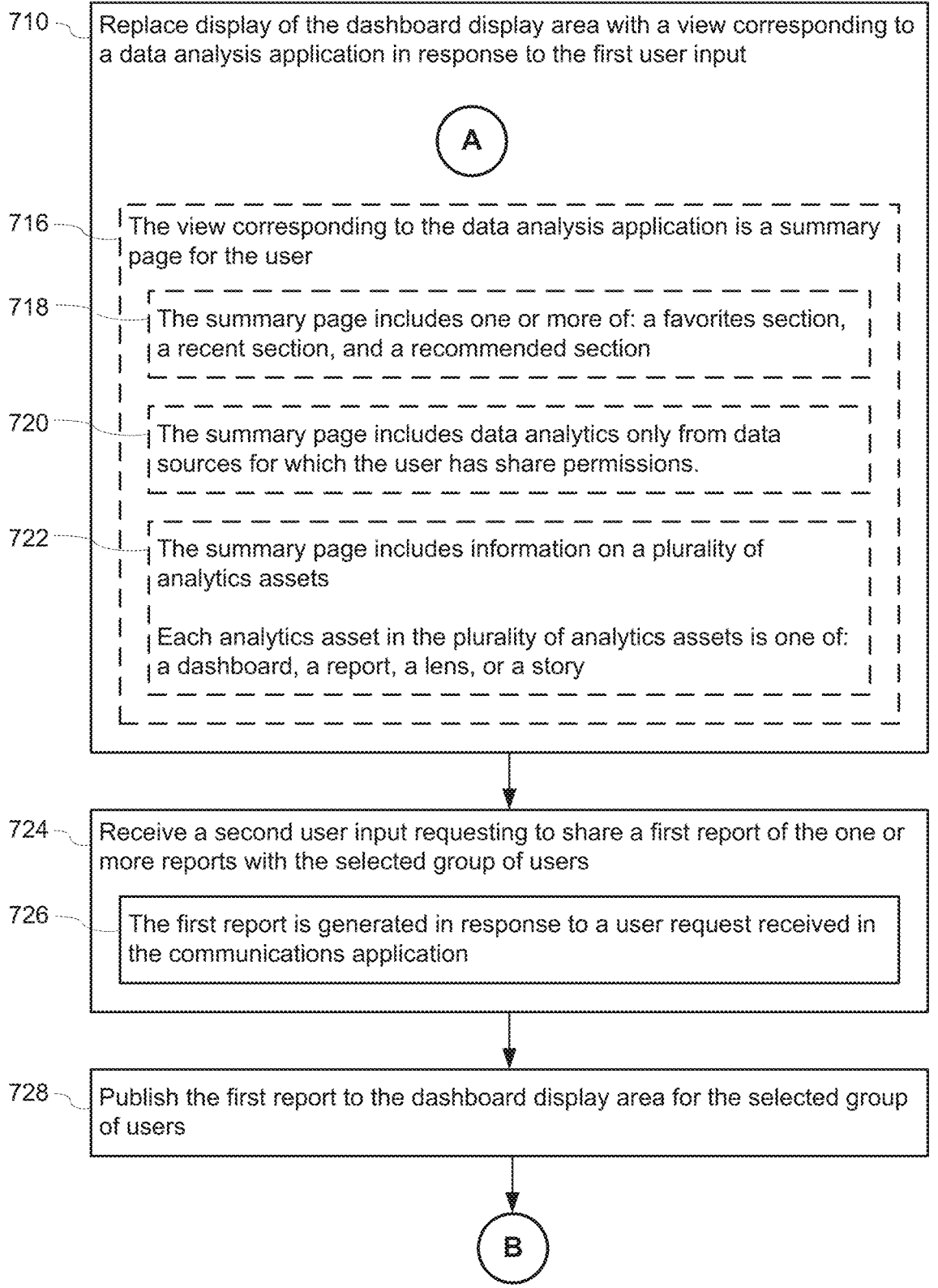
Figure 7C:
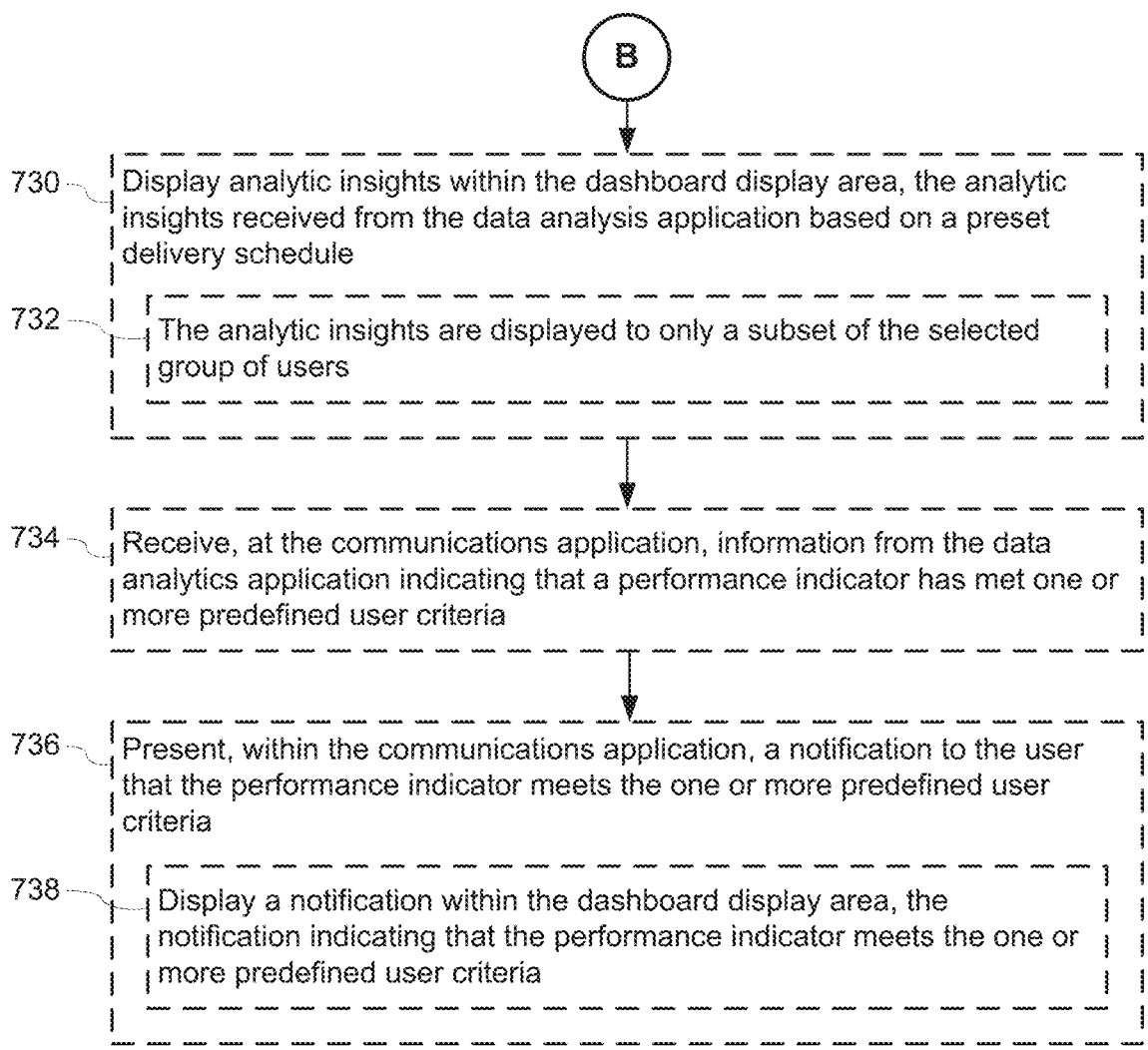

FIGS. 7A-7C provide a flowchart of a method 700 for using a communications application to analyze and distribute data analytics in accordance with some implementations. The method 700 is performed at a computing system (e.g., the computing device 600) having a display, one or more processors, and memory. In some implementations, the memory stores one or more programs configured for execution by the one or more processors.

The computing system displays (702) a first user interface (e.g., the user interface 100) for a communications application (e.g., the communications application 622), the first user interface including a dashboard display area (e.g., channel 102) for a selected group of users.

In some implementations, the communications application includes (704) a plurality of channels, where: (i) each channel of the plurality of channels has a corresponding set of access permissions, (ii) the dashboard display area is displayed within a first channel (e.g., the channel 102) of the plurality of channels, and (iii) the selected group of users have access permissions for the first channel.

The computing system receives (706) a first user input selecting a view corresponding to a data analysis application. For example, the first user input selects a view for the linked application 110. In some implementations, the first user interface includes (708) a navigation tab (e.g., the navigation tab 104), and the first user input selects the data analysis application from the navigation tab (e.g., as illustrated in FIG. 3A).

The computing system replaces (710) display of the dashboard display area with a view corresponding to a data analysis application (e.g., the application view 300) in response to the first user input. For example, FIG. 3A shows the channel 102 in FIG. 2E replaced with the application view 300. The data analysis application is (712) a separate application from the communications application. The view corresponding to the data analysis application provides (714) access to one or more reports (e.g., the report asset 317) generated, using credentials of a user of the communication application, without user input to execute or open the data analysis application.

In some implementations, the view corresponding to the data analysis application is (716) a summary page for the user (e.g., the home tab 306 shown in FIG. 3A).

In some implementations, the summary page includes (718) one or more of: a favorites section, a recent section, and a recommended section. For example, FIG. 3A shows a recents section 314 and a favorites section 316. In some implementations, the summary page includes (720) data analytics only from data sources for which the user has share permissions. In some implementations, the summary page includes (722) information on a plurality of analytics assets, where each analytics asset in the plurality of analytics assets is one of: a dashboard, a report, a lens, or a story. For example, FIG. 3A shows a dashboard asset 315, a report asset 317, and a story asset 319.

The computing system receives (724) a second user input requesting to share a first report of the one or more reports with the selected group of users. For example, a user selection of the share button 344 in FIG. 3G or the share button 386 in FIG. 3I.

The first report is (726) generated in response to a user request received in the communication application. For example, the report in FIG. 3G is generated in response to a user selection of the view details affordance 326 in FIG. 3F.

The computing system publishes (728) the first report to the dashboard display area for the selected group of users. For example, FIG. 4A shows information from the report asset 325 published to the sales team channel 102.

In some implementations, the computing system displays (730) analytic insights within the dashboard display area, the analytic insights received from the data analysis application based on a preset delivery schedule. For example, FIG. 2B shows the analytic assets 208 and 210 from the watchlist digest displayed in the channel 102. In some implementations, the analytic insights are displayed (732) to only a subset of the selected group of users.

In some implementations, the computing system receives (734), at the communications application, information from the data analytics application indicating that a performance indicator has met one or more predefined user criteria. In some implementations, the computing system presents (736), within the communications application, a notification to the user that the performance indicator meets the one or more predefined user criteria. For example, the notification is displayed in the user's home tab 306 or messages tab 308 of FIG. 3A. In some implementations, the computing system displays (738) a notification within the dashboard display area, the notification indicating that the performance indicator meets the one or more predefined user criteria. For example, the notification is published to the channel 102.

Turning now to some example implementations.

(A1) In one aspect, some implementations include a method (e.g., the method 700) for analyzing and distributing data analytics performed at an electronic device (e.g., the computing device 600). The method includes: (i) displaying a first user interface for a communications application (e.g., the communications application 622), the first user interface including a dashboard display area (e.g., the channel 102) for a selected group of users; (ii) in response to a first user input, replacing display of the dashboard display area with a view corresponding to a data analysis application, where (a) the data analysis application is a separate application from the communications application; and (b) the view corresponding to the data analysis application provides access to one or more reports generated, using credentials of a user of the communications application, without user input to execute or open the data analysis application; (iii) receiving a second user input requesting to share a first report of the one or more reports with the selected group of users, wherein the first report is generated in response to a user request received in the communications application; and (iv) publishing the first report to the dashboard display area for the selected group of users.

(A2) In some implementations of A1, the first user interface further includes a navigation tab (e.g., the navigation tab 104), and the first user input selects the data analysis application from the navigation tab.

(A3) In some implementations of A2, the navigation tab includes an application section (e.g., the Apps section of the navigation tab 104 in FIG. 1) that lists applications linked to the communications application. In some implementations, functions of the listed applications are executed within the communications application.

(A4) In some implementations of A1-A3, the communications application includes a plurality of channels, where (i) each channel of the plurality of channels has a corresponding set of access permissions, (ii) the dashboard display area is displayed within a first channel of the plurality of channels, and (iii) the selected group of users have access permissions for the first channel (e.g., read, write, and share permissions).

(A5) In some implementations of A1-A4, the method further includes displaying analytic insights to the user via the view corresponding to the data analysis application.

(A6) In some implementations of A5, the method further includes, prior to displaying the analytic insights to the user, receiving a third user input scheduling delivery of the analytic insights on a periodic basis. For example, the delivery schedule is daily, weekly, or monthly. In some implementations, the delivery schedule is based on changes in the data meeting preset criteria.

(A7) In some implementations of A1-A6, the method further includes periodically displaying analytic insights from the data analysis application within the dashboard display area based on a delivery schedule. In some implementations, the delivery schedule is set by a user of the select group of users. In some implementations, display of the analytic insights includes displaying a percentage change from last time displayed and/or indicators (e.g., emojis) expressing positive or negative change.

(A8) In some implementations of A1-A7, the method further includes: (i) receiving, at the communications application, information from the data analytics application indicating that a performance indicator has met one or more predefined user criteria; and (ii) presenting, within the communications application, a notification to the user that the performance indicator meets the one or more predefined user criteria. In some implementations, the communications application presents a user interface to the user for setting up notifications for performance indicators. In some implementations, the linked application (e.g., the linked application 110) is used to setup notifications.

(A9) In some implementations of A1-A8, the method further includes: (i) receiving, at the communications application, information from the data analytics application that a performance indicator has met one or more predefined user criteria; and (ii) displaying a notification within the dashboard display area, the notification indicating that the performance indicator meets the one or more predefined user criteria. In some implementations, the notification includes metadata (e.g., requester name, and/or notification criteria). In some implementations, the notification is sent to users identified by a user who setup the notification criteria. In some implementations, the user setting up the notification criteria is only able to have it sent to users who have appropriate permissions for the data (e.g., read permissions).

(A10) In some implementations of A1-A9, the method further includes, at the communications application: (i) sending an indication to the data analytics application that a second user has viewed the first report; (ii) receiving from the data analytics application one or more insights related to the first report; and (iii) presenting the one or more insights to the second user. In some implementations, the one or more insights are presented in the application view 300. In some implementations, the one or more insights are presented in the channel 102. In some implementations, the one or more insights are presented in the channel 102, but are only visible to the second user. In some implementations, the indication is based on receipt of the second user's credentials to unfurl a URL for the first report.

(A11) In some implementations of A1-A10, displaying the dashboard display area includes displaying one or more insights from the data analytics application. In some implementations, the insights are displayed only to a particular user. In some implementations, the insights are based on prior communications in the dashboard display area (text conversations, previous reports, dashboards, etc.).

(A12) In some implementations of A1-A11, the view corresponding to the data analysis application comprises a home (summary) page for the user. For example, the application view 300 shows information on the home tab 306 in FIG. 3A.

(A13) In some implementations of A12, the home page includes data analytics only from data sources for which the user has share permissions. In some implementations, a loss of share permissions for a data source results in a notification message being displayed to the user.

(A14) In some implementations of A12 or A13, the home page includes one or more of: a favorites section (e.g., the favorites section 316), a recent section (e.g., the recents section 314), and a recommended section.

(A15) In some implementations of A12-A14, the home page includes information on an analytics asset, wherein the analytics asset is one of: a dashboard, a report, a lens, or a story. For example, FIG. 3A shows the application view 300 including the dashboard asset 315, the report asset 317, and the story asset 319.

(A16) In some implementations of A12-A15, the home page includes information for a plurality of analytic assets, and the information for each analytic asset includes the asset name and asset type. In some implementations, the information further includes one or more of: a folder storing the asset, a last viewed date for the asset, creator of the asset, a data source of the asset, and information on why a recommended asset has been recommended. In some implementations, each asset on the home page is built by a user via the communications application 622 or the data analysis application 632.

(A17) In some implementations of A16, the home page includes a filter option for filtering display of analytic assets on the home page, e.g., by asset type. For example, filtering to only include dashboard types, or filtering to include assets starting with the letter 'A', or filtering to include dashboards created by a particular user.

(A18) In some implementations of A16 or A17, the home page includes a search option for searching for analytic assets. For example, the search option enables a user to search by asset name, asset type, asset creator, and the like.

(A19) In some implementations of A16-A18, the information for each analytic asset includes a share affordance for sharing the analytic asset, and selection of the share affordance causes display of a share view of the analytic asset. In some implementations, the share view includes one or more of: a listing of teams and/or users to share with, metadata for the asset, a snapshot of the asset. In some implementations, the listing of teams and/or user includes only users and teams that have view permissions for the asset.

(A20) In some implementations of A16-A19, the information for at least one analytic asset includes a subscribe affordance for subscribing to updates for the analytic asset, and selection of the subscribe affordance causes display of a subscription menu of the analytic asset. In some implementations, subscribing results in receiving regular updates for the asset. In some implementations, the subscription menu includes an option to set a subscription interval, and/or an option to set recipients. In some implementations, the information obtained by the subscription menu is transferred to the data analytics application and corresponding updates are generated by a function of the data analytics application.

(A21) In some implementations of A16-A20, the information for at least one analytic asset includes a favorite affordance for favoriting the analytic asset, and selection of the favorite affordance causes display of the information for the at least one analytic asset within a favorites section of the home page.

(A22) In some implementations of A16-A21, the information for at least one analytic asset includes an application view affordance for viewing the analytic asset within the data analytics application, and selection of the application view affordance causes execution of the data analytics application with indication of the at least one analytic asset.

(A23) In some implementations of A16-A22, the information for at least one analytic asset includes a view affordance for viewing the analytic asset, and selection of the view affordance causes generation of the analytic asset in real time.

(A24) In some implementations of A16-A23, the home page includes a predictions affordance for at least one analytic asset, and selection of the predictions affordance causes generation of insights and recommendations based on the data of the first report.

(A25) In some implementations of A1-A24, the first report is generated using real time data.

(A26) In some implementations of A1-A25, the method further includes, at a second electronic device of a user of the selected group of users: (i) receiving, via the communications application, notification of the publication of the first report; (ii) in response to the notification, obtaining the first report from the data analytics application using credentials of the second user; and (iii) displaying the obtained first report to the second user in the dashboard display area. In some implementations, displaying the obtained first report to the second user in the dashboard display area includes unfurling a URL for the first report.

(A27) In some implementations of A26: (i) the method further includes, prior to obtaining the first report, receiving confirmation from the second user to use the credentials of the second user to view the first report; and (ii) the first report is obtained from the data analytics application in accordance with the confirmation from the second user.

(A28) In some implementations of A1-A27, publishing the first report includes displaying one or more of the following: an asset type of the first report, an asset name for the first report, a creator of the first report, a creation date for the first report, and a data refresh date for the first report.

(A29) In some implementations of A1-A28, publishing the first report includes displaying a text message from the user. In some implementations, the text message includes a mention for particular people of the select group of people.

(A30) In some implementations of A1-A29, the first report is generated via a headless browser service. For example, in response to the user request received in the communications application, a version of the data analysis application is executed in a headless browser to generate one or more data visualizations for the first report. In this example, images of the data visualizations are captured and included in the first report published by the communications application.

In another aspect, some implementations include a computing system including one or more processors and memory coupled to the one or more processors, the memory storing one or more programs configured to be executed by the one or more processors, the one or more programs including instructions for performing any of the methods described herein (e.g., A1-A30 above).

In yet another aspect, some implementations include a non-transitory computer-readable storage medium storing one or more programs for execution by one or more processors of a computing system, the one or more programs including instructions for performing any of the methods described herein (e.g., A1-A30 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at an electronic device, comprising:
    displaying a first user interface for a communications application, the first user interface including a dashboard display area for a selected group of users;
    in response to a first user interaction with the first user interface, replacing display of the dashboard display area with a view corresponding to a data analysis application, within the communications application, wherein:
        the data analysis application is a separate application from the communications application; and
        the view corresponding to the data analysis application provides access to one or more reports generated automatically using credentials of a user of the communications application;
    in response to user selection of a first report in the view corresponding to the data analysis application, opening a window corresponding to the communication application;
    receiving a second user interaction, within the window, requesting to share the first report of the one or more reports with the selected group of users, wherein the first report is generated in response to a user request received in the communications application; and
    publishing the first report to the dashboard display area for the selected group of users.

2. The method of claim 1, wherein the first user interface further includes a navigation tab, and wherein the first user interaction comprises selection of the data analysis application from the navigation tab.

3. The method of claim 1, wherein:
    the communications application comprises a plurality of channels;
    each channel of the plurality of channels has a corresponding set of access permissions;
    the dashboard display area is displayed within a first channel of the plurality of channels; and
    the selected group of users have access permissions for the first channel.

4. The method of claim 1, further comprising periodically displaying analytic insights within the dashboard display area, the analytic insights received from the data analysis application based on a preset delivery schedule.

5. The method of claim 4, wherein displaying the analytic insights within the dashboard display area comprises displaying the analytic insights to only a subset of the selected group of users.

6. The method of claim 1, further comprising:
    receiving, at the communications application, information from the data analysis application indicating that a performance indicator has met one or more predefined user criteria; and
    presenting, within the communications application, a notification to the user that the performance indicator meets the one or more predefined user criteria.

7. The method of claim 1, further comprising:
    receiving, at the communications application, information from the data analysis application that a performance indicator has met one or more predefined user criteria; and
    displaying a notification within the dashboard display area, the notification indicating that the performance indicator meets the one or more predefined user criteria.

8. The method of claim 1, wherein the view corresponding to the data analysis application comprises a summary page for the user, and wherein the summary page includes one or more of: a favorites section, a recent section, and a recommended section.

9. The method of claim 8, wherein the summary page includes data analytics only from data sources for which the user has share permissions.

10. The method of claim 8, wherein the summary page includes information on a plurality of analytics assets, wherein each analytics asset in the plurality of analytics assets is one of: a dashboard, a report, a lens, or a story.

11. A computing device, comprising:
    one or more processors;
    memory;
    a display; and
    one or more programs stored in the memory and configured for execution by the one or more processors, the one or more programs comprising instructions for:
        displaying a first user interface for a communications application, the first user interface including a dashboard display area for a selected group of users;
        in response to a first user interaction with the first user interface, replacing display of the dashboard display area with a view corresponding to a data analysis application within the communications application, wherein:
            the data analysis application is a separate application from the communications application; and
            the view corresponding to the data analysis application provides access to one or more reports generated automatically using credentials of a user of the communications application;

in response to user selection of a first report in the view corresponding to the data analysis application, opening a window corresponding to the communication application;

receiving a second user interaction, within the window, requesting to share the first report of the one or more reports with the selected group of users, wherein the first report is generated in response to a user request received in the communications application; and publishing the first report to the dashboard display area for the selected group of users.

12. The computing device of claim 11, wherein the first user interface further includes a navigation tab, and wherein the first user interaction comprises selection of the data analysis application from the navigation tab.

13. The computing device of claim 11, wherein:

the communications application comprises a plurality of channels;

each channel of the plurality of channels has a corresponding set of access permissions;

the dashboard display area is displayed within a first channel of the plurality of channels; and the selected group of users have access permissions for the first channel.

14. The computing device of claim 11, wherein the one or more programs further comprise instructions for periodically displaying analytic insights within the dashboard display area, the analytic insights received from the data analysis application based on a preset delivery schedule.

15. The computing device of claim 14, wherein the instructions for periodically displaying the analytic insights within the dashboard display area comprise instructions for displaying the analytic insights to only a subset of the selected group of users.

16. The computing device of claim 11, wherein the one or more programs further comprise instructions for:

receiving, at the communications application, information from the data analysis application indicating that a performance indicator has met one or more predefined user criteria; and presenting, within the communications application, a notification to the user that the performance indicator meets the one or more predefined user criteria.

17. The computing device of claim 11, wherein the one or more programs further comprise instructions for:

receiving, at the communications application, information from the data analysis application that a performance indicator has met one or more predefined user criteria; and displaying a notification within the dashboard display area, the notification indicating that the performance indicator meets the one or more predefined user criteria.

18. The computing device of claim 11, wherein the view corresponding to the data analysis application comprises a summary page for the user, and wherein the summary page includes one or more of: a favorites section, a recent section, and a recommended section.

19. A non-transitory computer-readable storage medium storing one or more programs configured for execution by a computing device having one or more processors, memory, and a display, the one or more programs comprising instructions for:

displaying a first user interface for a communications application, the first user interface including a dashboard display area for a selected group of users;

in response to a first user interaction with the first user interface, replacing display of the dashboard display area with a view corresponding to a data analysis application, within the communications application, wherein:

the data analysis application is a separate application from the communications application; and the view corresponding to the data analysis application provides access to one or more reports generated automatically using credentials of a user of the communications application;

in response to user selection of a first report in the view corresponding to the data analysis application, opening a window corresponding to the communication application;

receiving a second user interaction, within the window, requesting to share the first report of the one or more reports with the selected group of users, wherein the first report is generated in response to a user request received in the communications application; and publishing the first report to the dashboard display area for the selected group of users.

20. The non-transitory computer-readable storage medium of claim 19, wherein the one or more programs further comprises instructions for periodically displaying analytic insights within the dashboard display area, the analytic insights received from the data analysis application based on a preset delivery schedule.

* * * * *